US011164149B1

(12) United States Patent
Williams et al.

(10) Patent No.: US 11,164,149 B1
(45) Date of Patent: Nov. 2, 2021

(54) METHOD AND SYSTEM FOR WAREHOUSE INVENTORY MANAGEMENT USING DRONES

(71) Applicant: Corvus Robotics, Inc., Chicago, IL (US)

(72) Inventors: Spencer Williams, Dallas, TX (US); Yue Wu, Evanston, IL (US)

(73) Assignee: CORVUS ROBOTICS, INC., Boston, MA (US)

( * ) Notice: Subject to any disclaimer, the term of this patent is extended or adjusted under 35 U.S.C. 154(b) by 447 days.

(21) Appl. No.: 15/692,336

(22) Filed: Aug. 31, 2017

Related U.S. Application Data

(60) Provisional application No. 62/381,781, filed on Aug. 31, 2016.

(51) Int. Cl.
| | |
|---|---|
| *G06Q 10/08* | (2012.01) |
| *G06K 19/06* | (2006.01) |
| *B64C 39/02* | (2006.01) |

(52) U.S. Cl.
CPC ......... *G06Q 10/0875* (2013.01); *B64C 39/02* (2013.01); *G06K 19/06028* (2013.01); *B64C 2201/123* (2013.01)

(58) Field of Classification Search
CPC .... G06Q 10/08; G06Q 10/0875; B64C 39/02; B64C 2201/123; G06K 19/06028
See application file for complete search history.

(56) References Cited

U.S. PATENT DOCUMENTS

| | | | | |
|---|---|---|---|---|
| 9,251,417 | B1* | 2/2016 | Xu | G06K 9/00664 |
| 9,471,059 | B1* | 10/2016 | Wilkins | G05D 1/0016 |
| 10,002,342 | B1* | 6/2018 | Oikarinen | G05D 1/042 |
| 10,212,319 | B1* | 2/2019 | Carter, II | H04N 5/2354 |
| 2014/0257595 | A1* | 9/2014 | Tillmann | G05D 1/0022 701/2 |
| 2016/0070265 | A1* | 3/2016 | Liu | B64C 39/024 701/3 |
| 2016/0247115 | A1* | 8/2016 | Pons | G06K 7/1413 |
| 2016/0247116 | A1 | 8/2016 | Olivo et al. | |
| 2016/0280460 | A1* | 9/2016 | Porat | B25J 5/04 |
| 2016/0282126 | A1* | 9/2016 | Watts | H03K 19/17768 |
| 2016/0337562 | A1* | 11/2016 | Kang | H04N 5/2257 |
| 2017/0212529 | A1* | 7/2017 | Kumar | G01C 21/165 |
| 2017/0247108 | A1* | 8/2017 | Ljubuncic | G06K 9/2063 |
| 2018/0029797 | A1* | 2/2018 | Hance | B65G 1/1373 |

* cited by examiner

*Primary Examiner* — Florian M Zeender
*Assistant Examiner* — Whitney Poffenbarger
(74) *Attorney, Agent, or Firm* — Hsuanyeh Law Group PC

(57) ABSTRACT

A system that employs aerial drones for inventory management is disclosed. The system includes at least one aerial drone with an optical sensor, an indoor positioning system, and a controller on the aerial drone. The controller is communicatively coupled to the optical sensor and the indoor positioning system. The controller is configured to localize and navigate the aerial drone within a facility based on one or more signals from the indoor positioning system. The controller is further configured to detect identifiers attached to respective inventory items via the optical sensor and to store information associated with the detected identifiers in an onboard memory. The controller may be further configured to transmit the information associated with the detected identifiers to a warehouse management system.

20 Claims, 37 Drawing Sheets

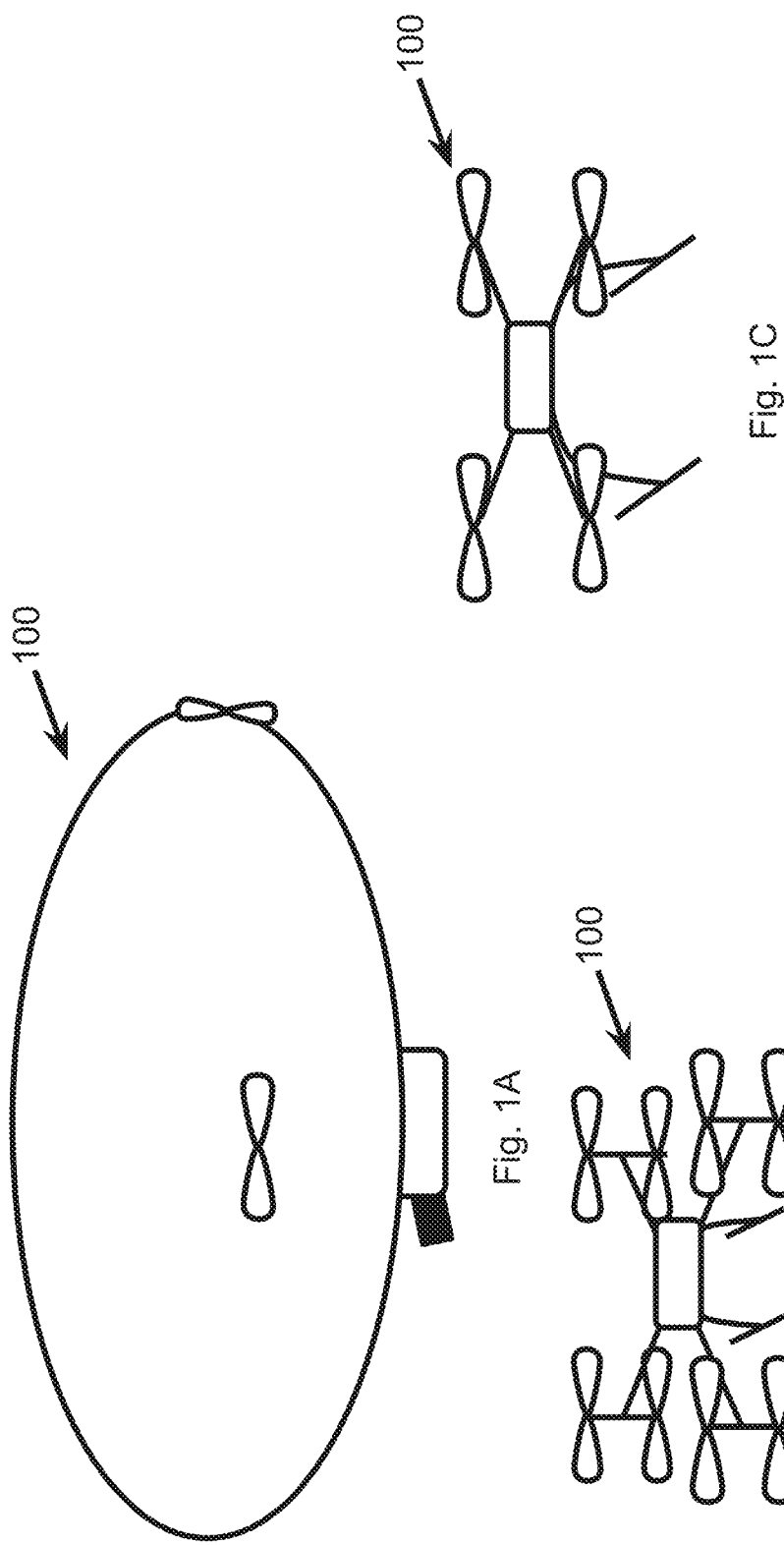

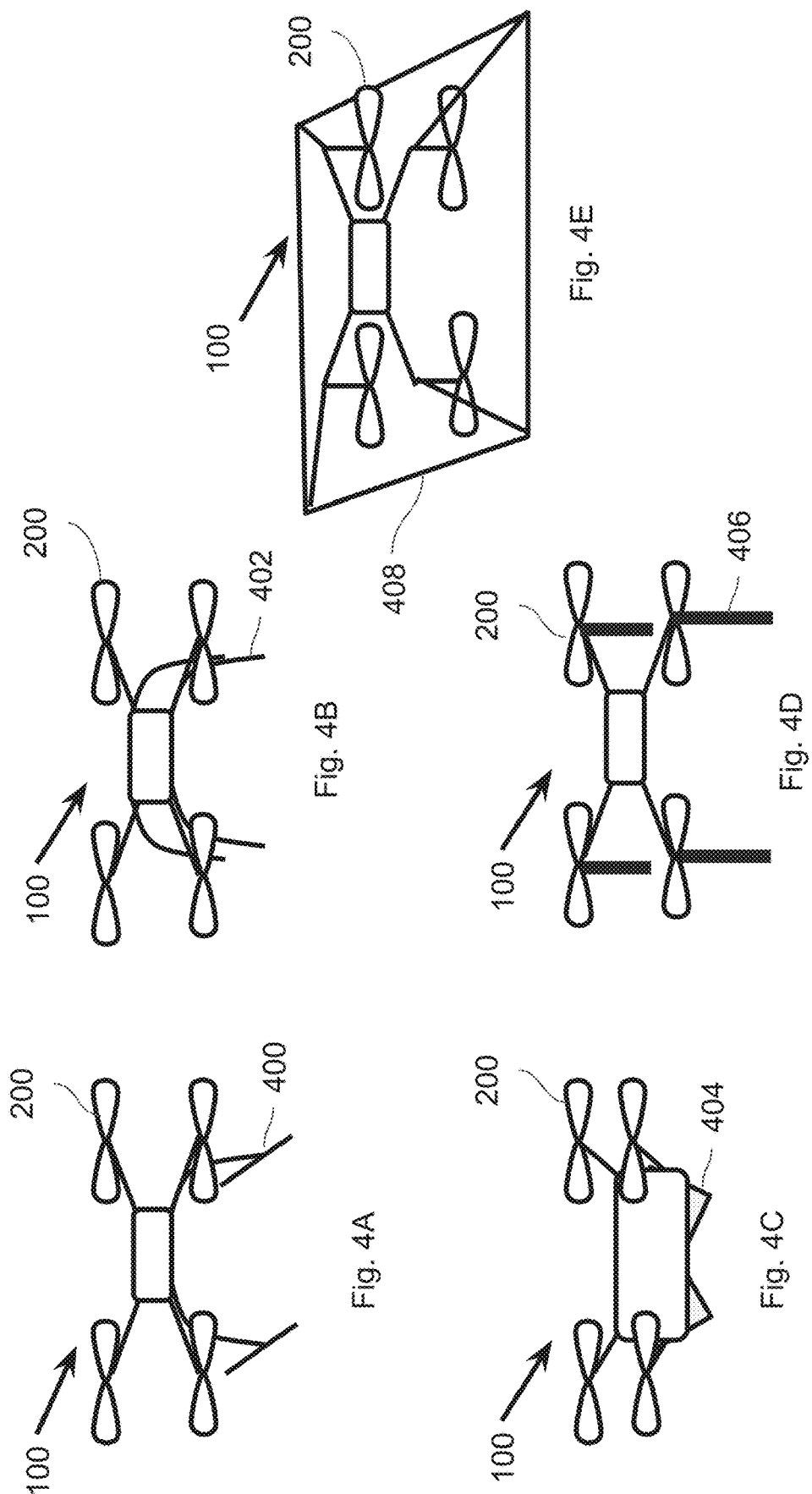

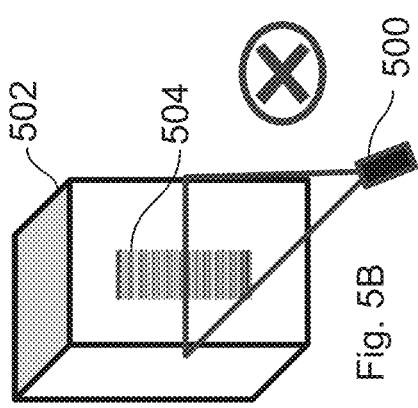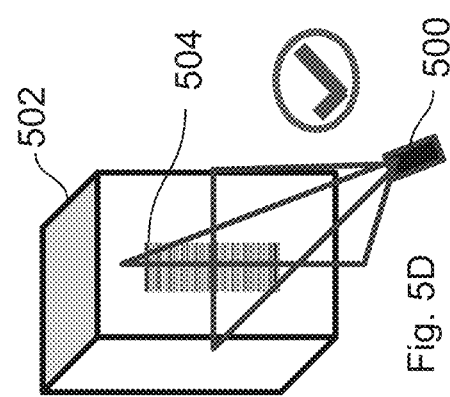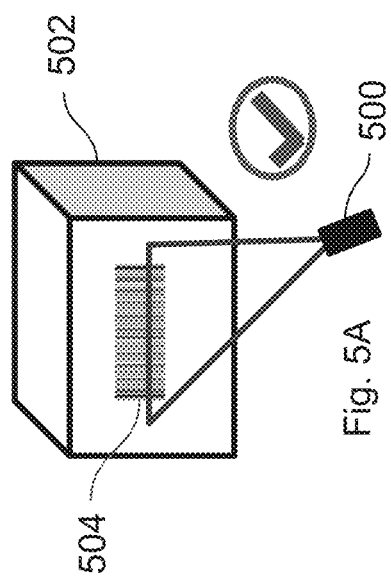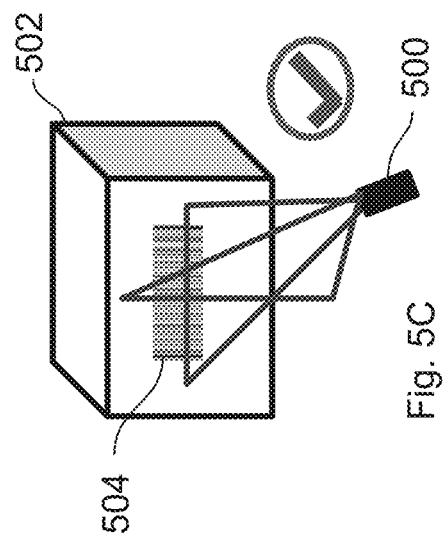

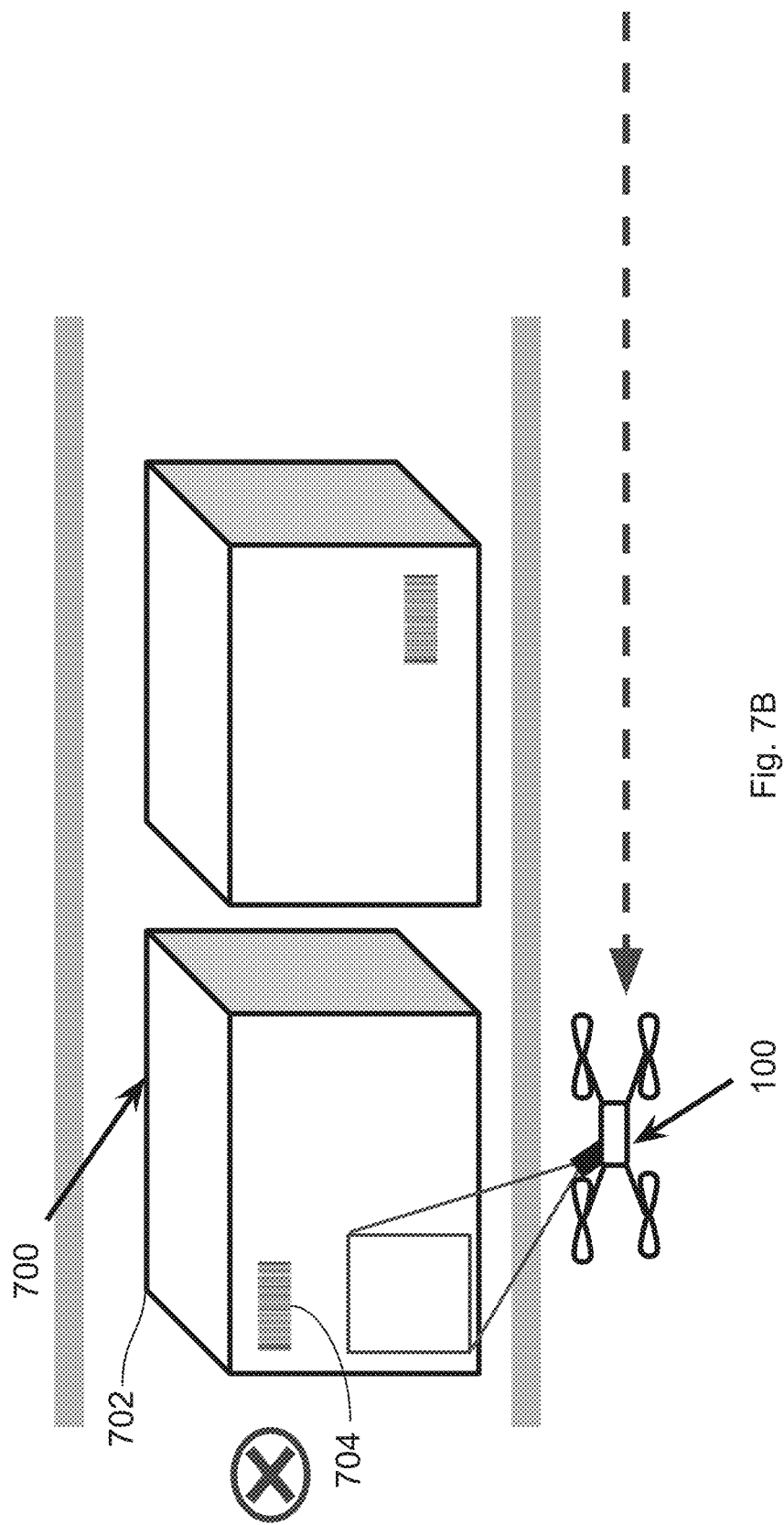

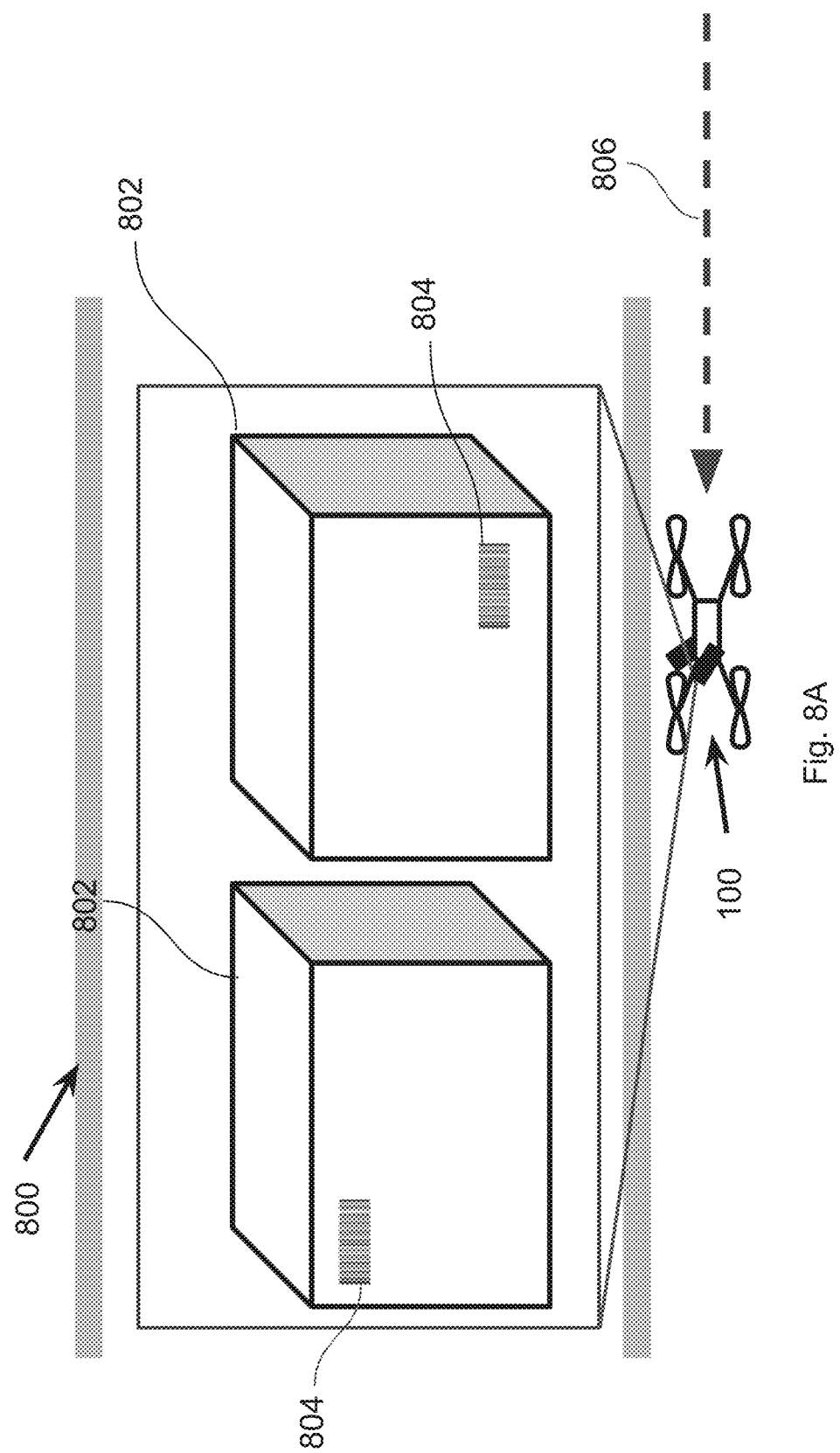

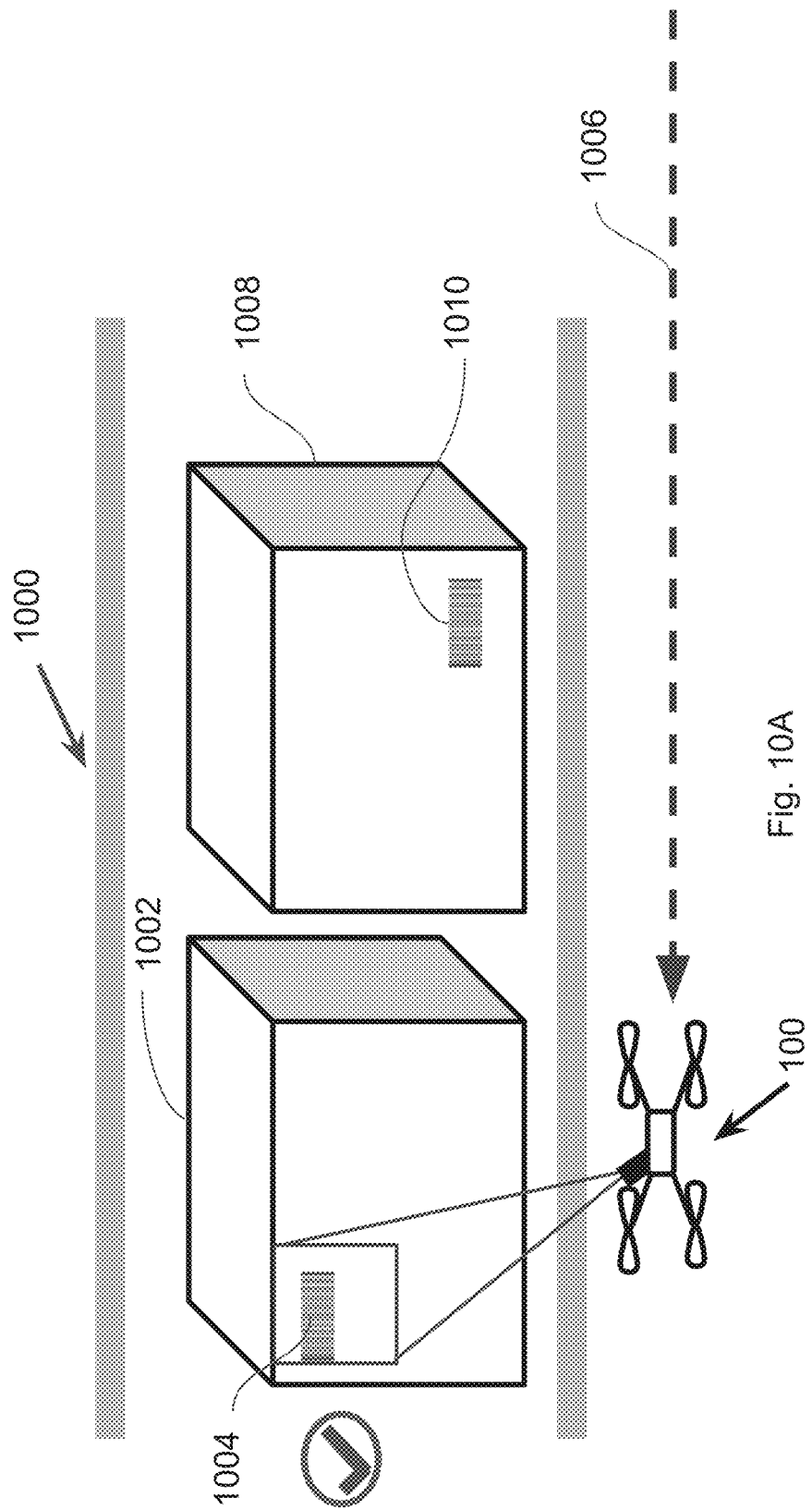

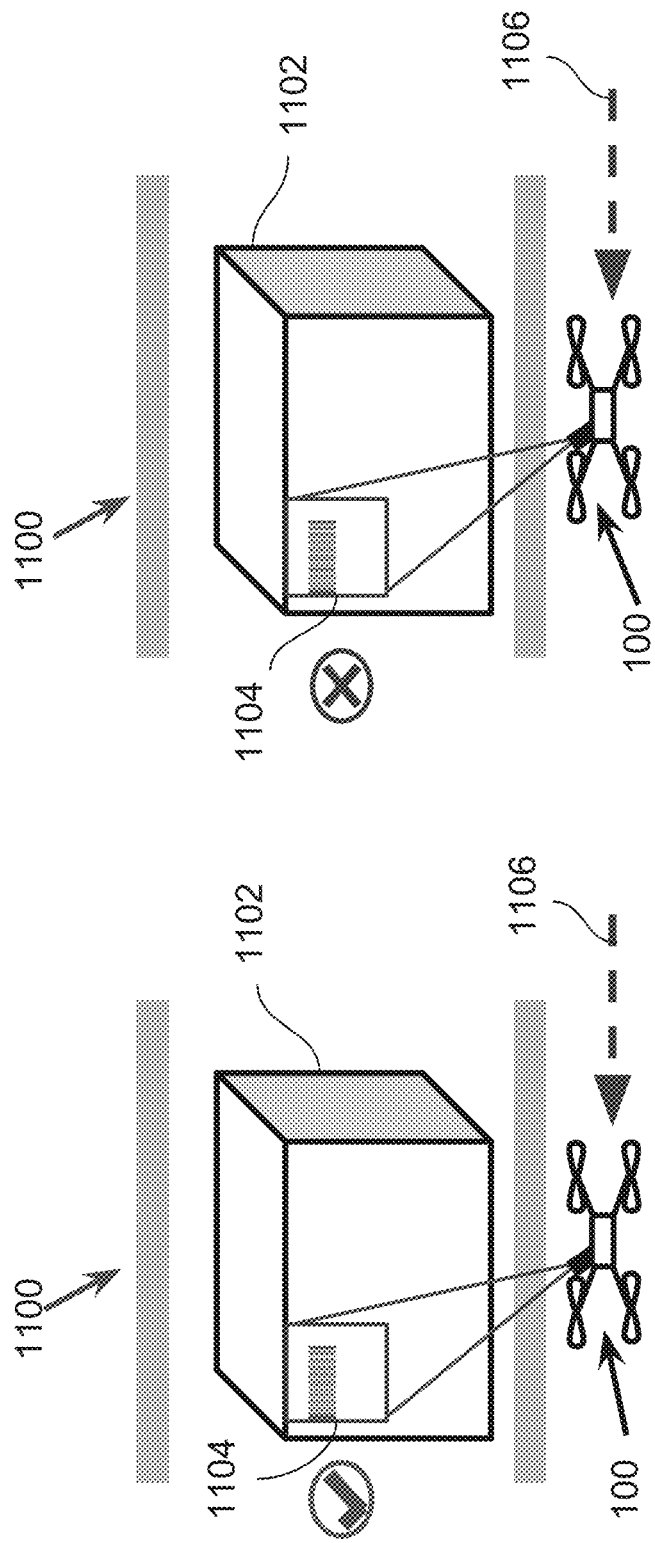

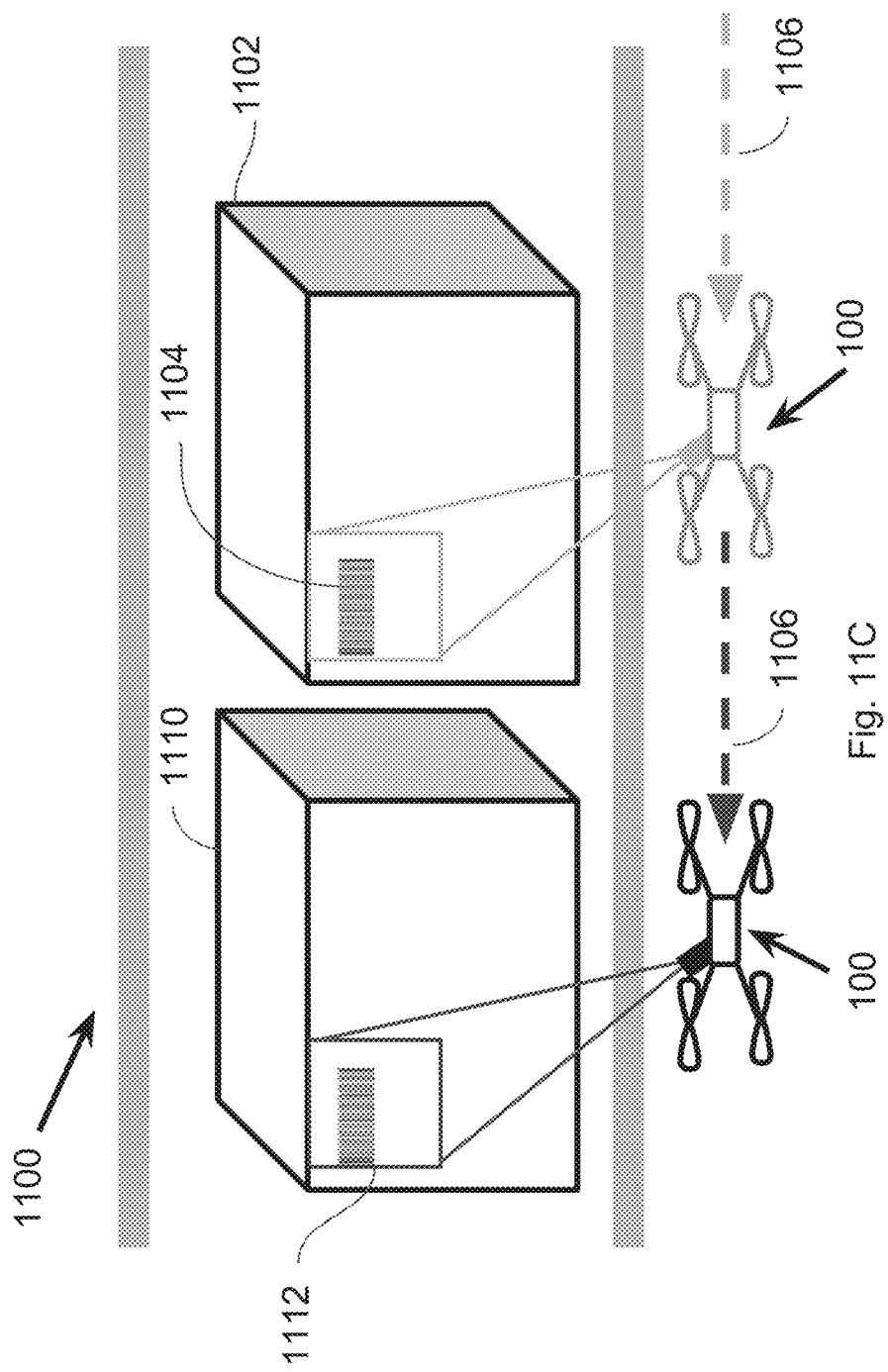

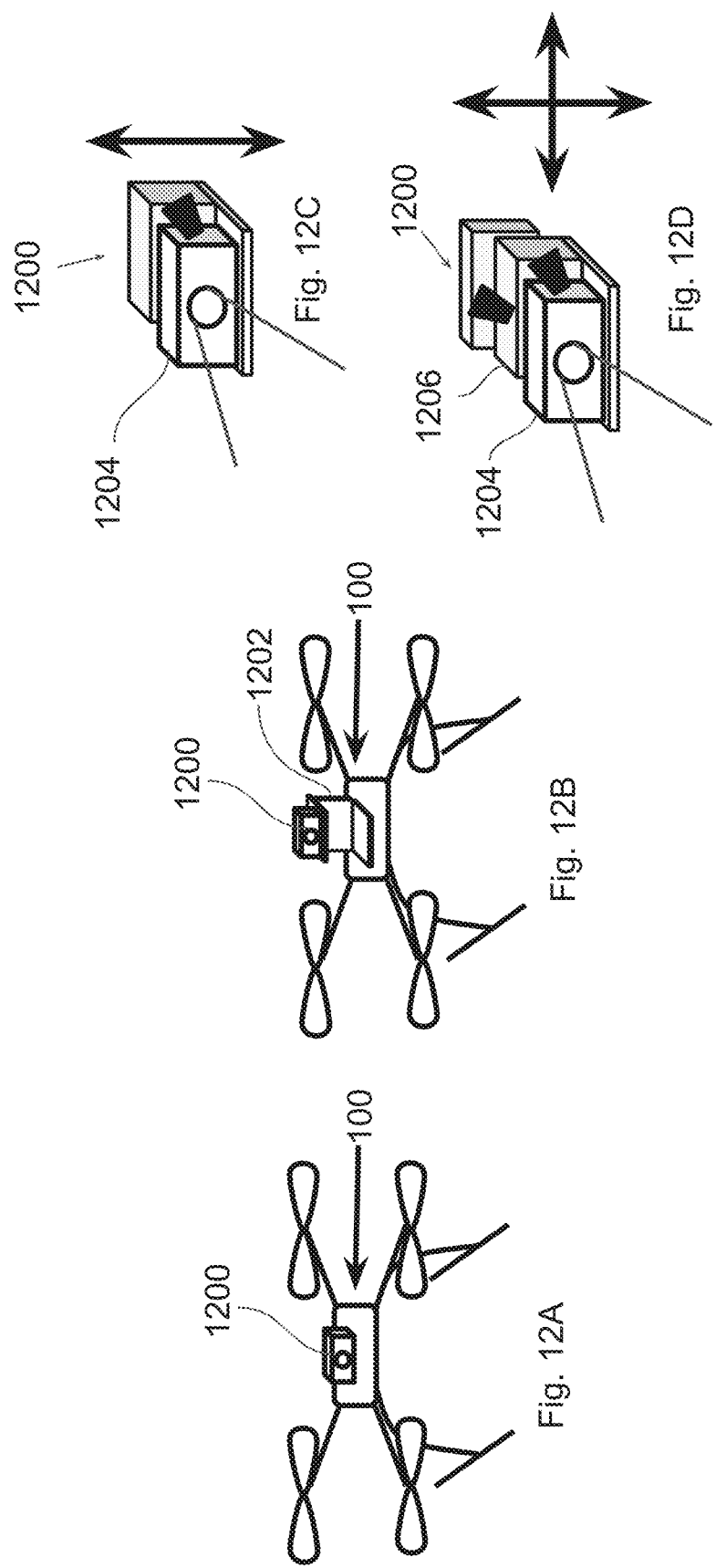

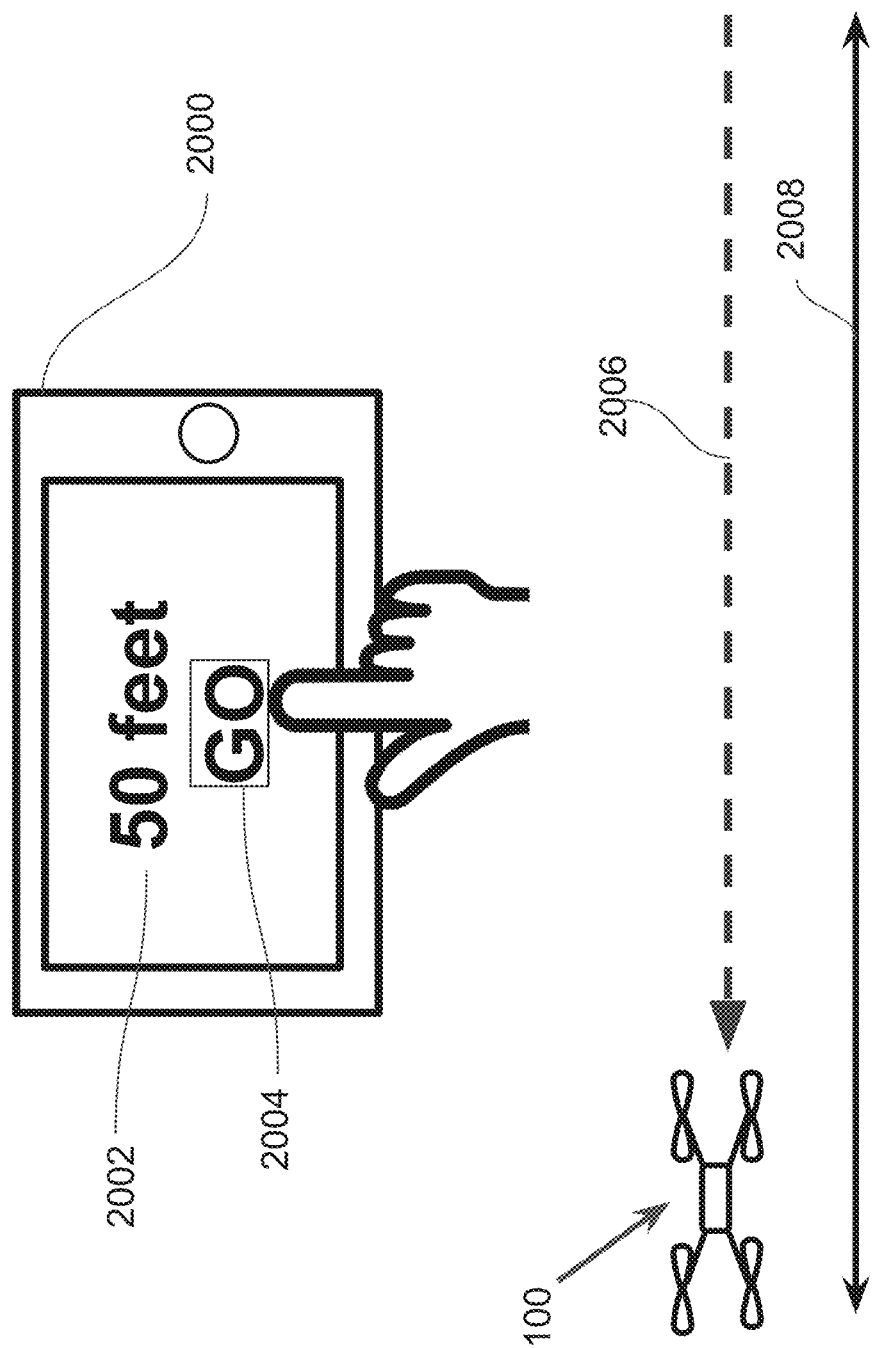

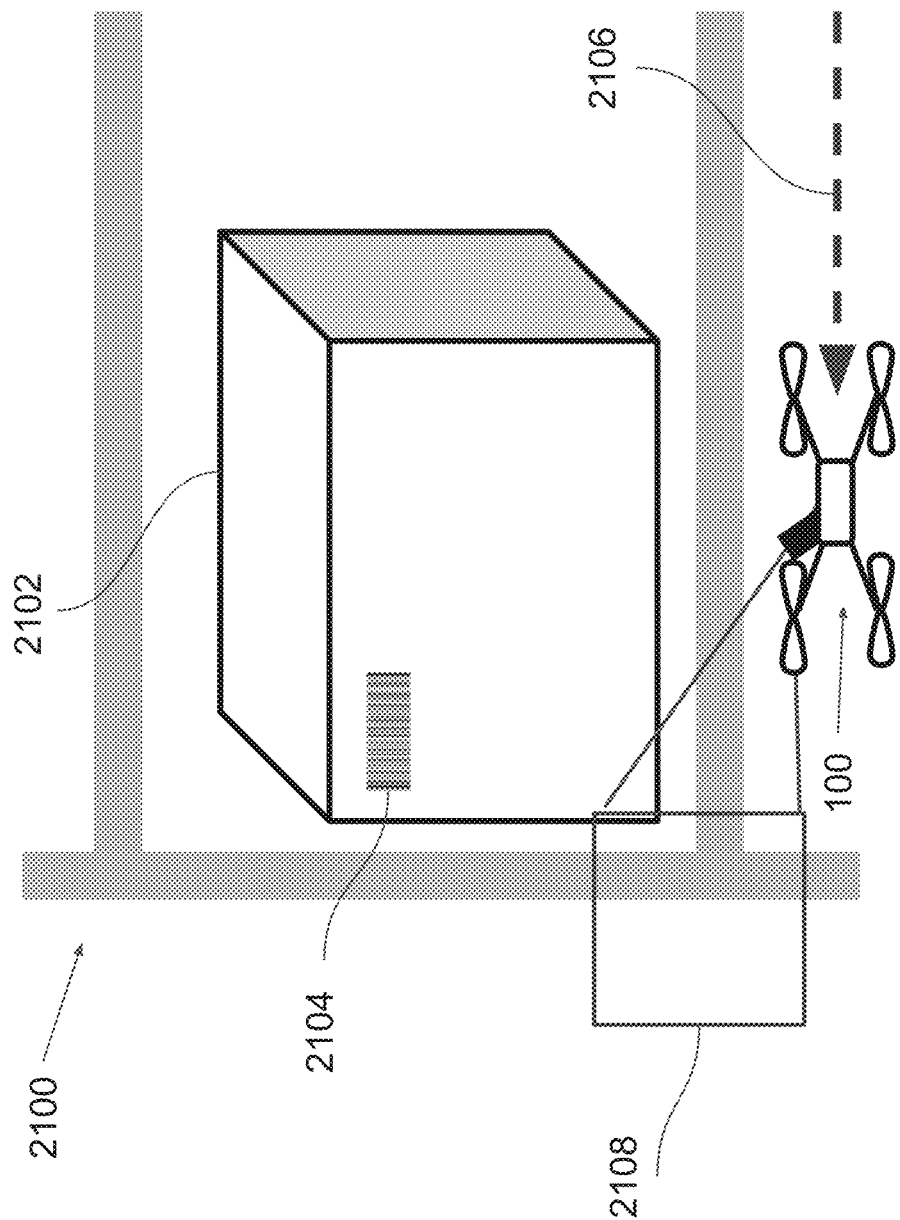

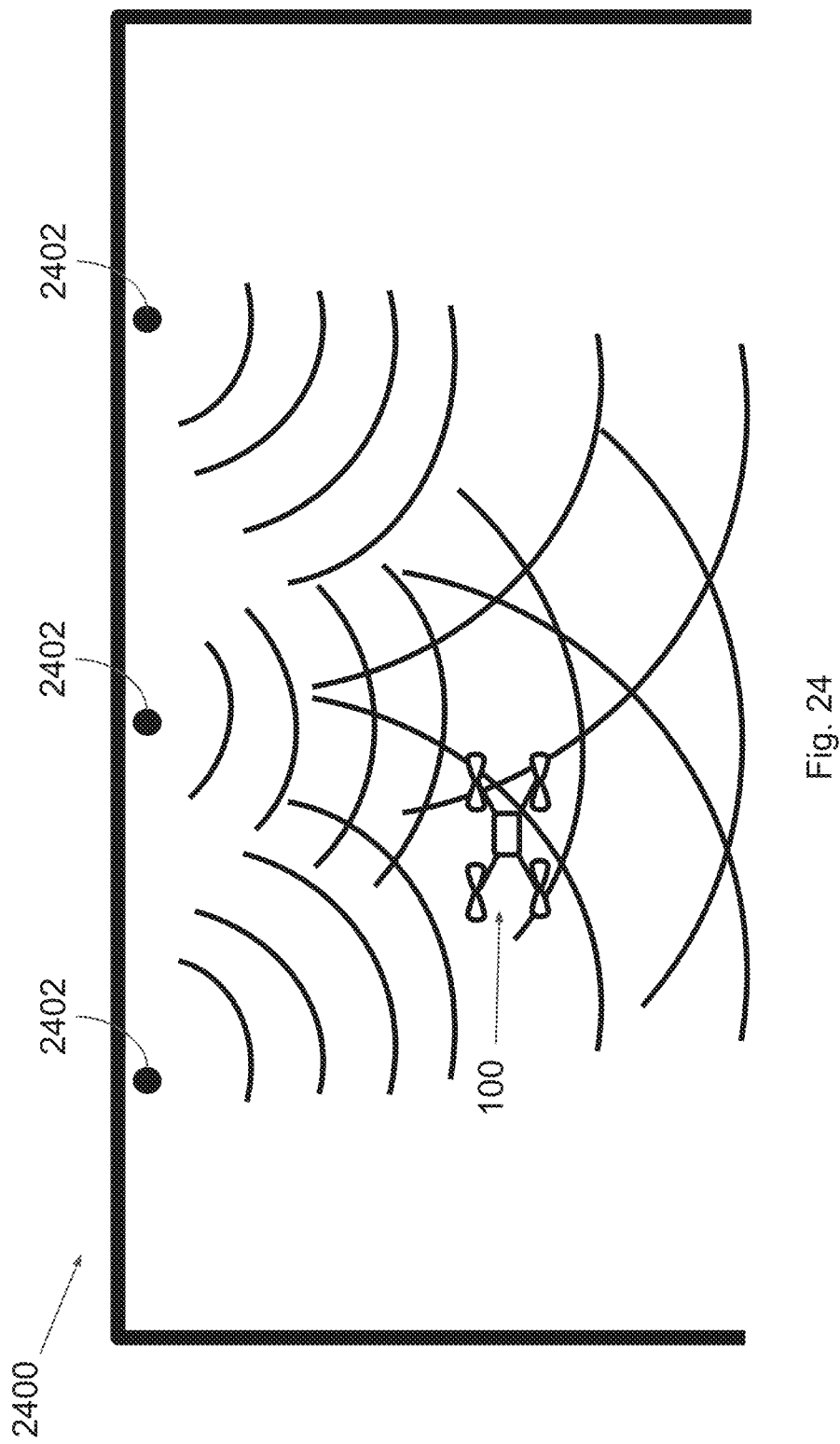

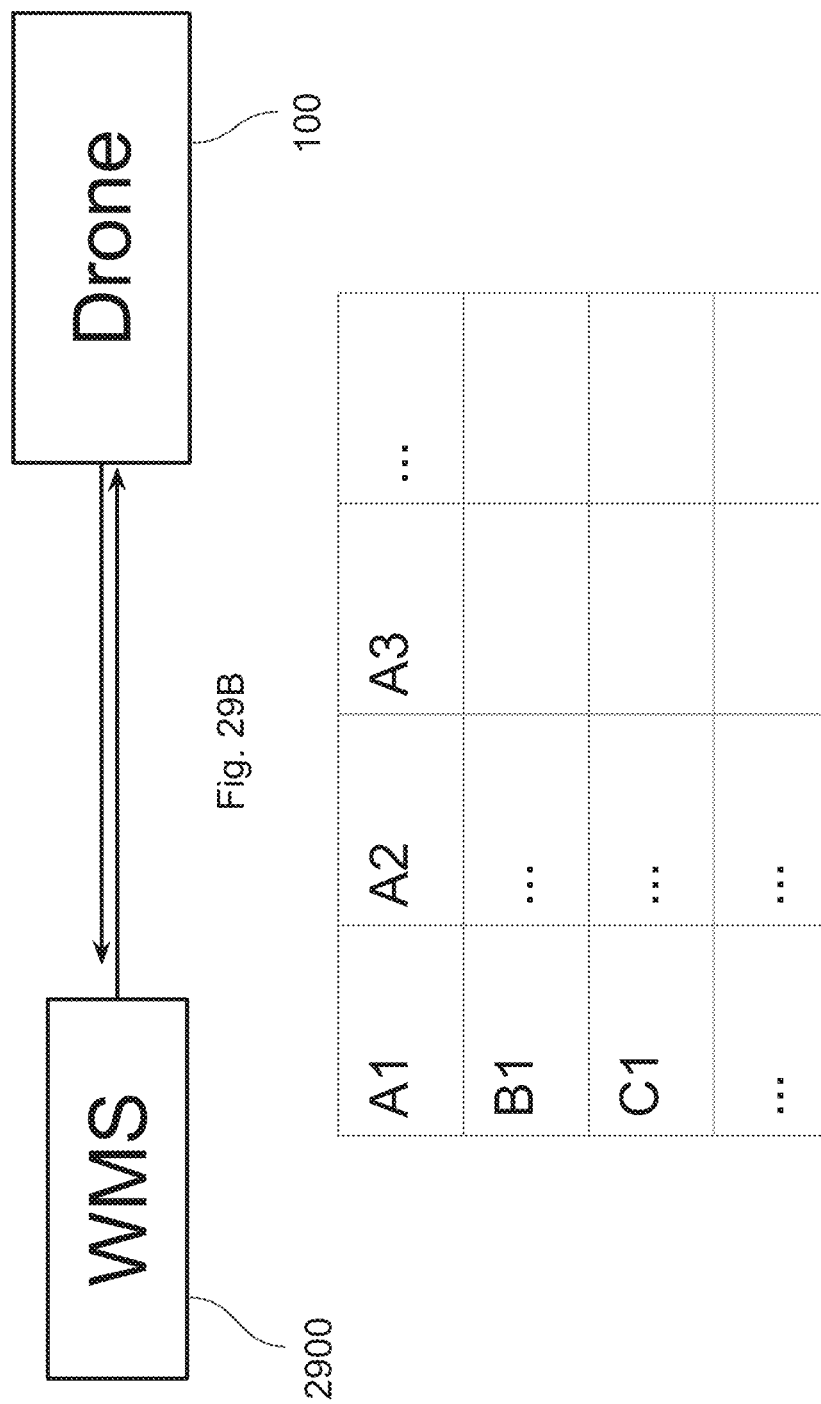

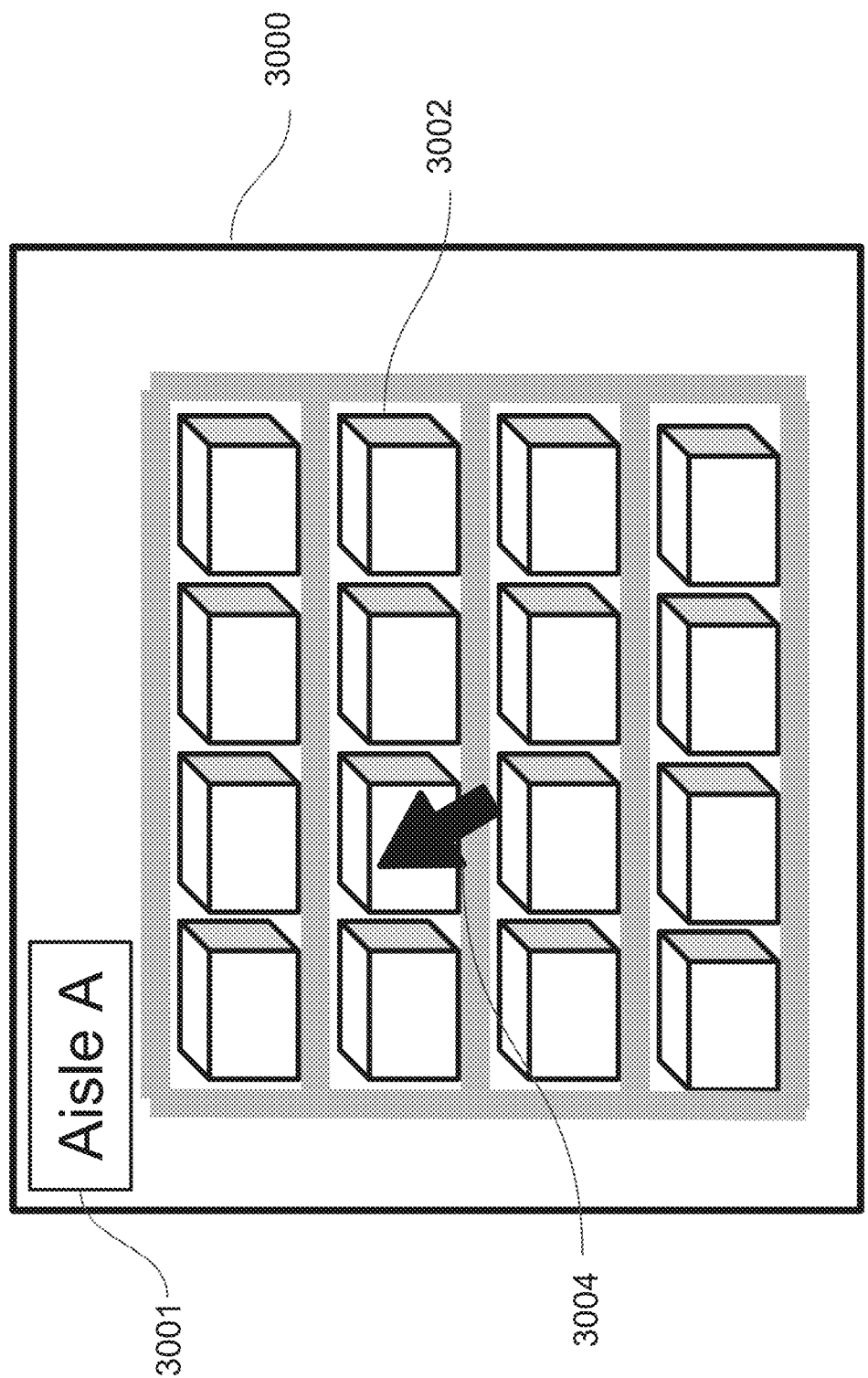

METHOD AND SYSTEM FOR WAREHOUSE INVENTORY MANAGEMENT USING DRONES

CROSS-REFERENCE TO RELATED APPLICATIONS

The present application claims the benefit under 35 U.S.C. § 119(e) of U.S. Provisional Application Ser. No. 62/381,781, filed Aug. 31, 2016, and titled "METHOD AND SYSTEM FOR WAREHOUSE INVENTORY MANAGEMENT USING DRONES," which is incorporated herein by reference in its entirety.

BACKGROUND

Today, the globalized supply chain ships countless goods made around the world to willing buyers. Most manufactured items sold at some point in time move through a warehouse. Many warehouse inventory management systems already make use of handheld label scanners to update and track items. However, there are many challenges in warehouse inventory management due to human error in scanning and updating inventory information. Even with inventory management software, managers and workers frequently don't know where specific items are, whether there are duplicates, whether items get lost or damaged, or what to do about shrinkage (e.g. items taken/replaced without updating the system). In addition, many tools and machines used today pose hazards to human workers who check inventory, such as falls from ladders, injuries from pallet movers or forklifts, and slips from liquid spills or leaks. Errors in inventory information can lead to costly under- or overstock for the warehouse company.

Since many warehouses have predictable layouts and repetitive work, there have been some attempts to use robotic machines to help with warehouse inventory management to automate warehouse tasks. Robotic arms help with carton removal and automated packing. Wheeled ground robots follow painted paths on open warehouse floors with wide aisles to move pallets and cartons. However, ground robots and robotic arms only move in two dimensions, unable to adjust for or see individual cases and packages at different heights, in warehouses with aisles sometimes stacked from floor to ceiling. Even if connected to inventory management systems, such machines are sometimes unable to efficiently provide a complete picture of warehouse inventory to warehouse managers.

SUMMARY

The following presents a general summary of aspects of the present disclosure. This summary is not intended to limit the scope of the present disclosure in any way, but it simply provides a general overview and context for the more detailed description that follows.

Aspects of this disclosure relate to a system that employs aerial drones for inventory management. The implementation of indoor drones for warehouses in the real-world is more complicated than simply attaching a barcode scanner to a drone. It involves technologies for indoor navigation, solving routing problems, and approaches to aligning a scanning sensor with inventory labels. In embodiments, the system includes at least one aerial drone with an optical sensor, an indoor positioning system, and a controller on the aerial drone. The controller is communicatively coupled to the optical sensor and the indoor positioning system. The controller is configured to localize and navigate the aerial drone within a facility based on one or more signals from the indoor positioning system. The controller is further configured to detect identifiers attached to respective inventory items via the optical sensor and to store information associated with the detected identifiers in an onboard memory. The controller may be further configured to transmit the information associated with the detected identifiers to a warehouse management system.

Aspects of this disclosure also relate to a method for inventory management using aerial drones. The method employs at least one aerial drone with an optical sensor and an indoor positioning system on the aerial drone. In implementations, the method includes: localizing and navigating the aerial drone within a facility based on one or more signals from the indoor positioning system; detecting identifiers attached to respective inventory items via the optical sensor; and storing information associated with the detected identifiers in an onboard memory of the aerial drone. In implementations, the information associated with the detected identifiers is then transmitted (or transmitted in real-time/near real-time) to a warehouse management system.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims.

FIG. 1A is an illustration of an aerial drone, in accordance with an example embodiment of the present disclosure.

FIG. 1B is an illustration of an aerial drone, in accordance with an example embodiment of the present disclosure.

FIG. 1C is an illustration of an aerial drone, in accordance with an example embodiment of the present disclosure.

FIG. 4A is an illustration of an aerial drone with a landing gear including horizontal bars for interfacing with a landing surface, in accordance with an example embodiment of the present disclosure.

FIG. 4B is an illustration of an aerial drone with a landing gear including feet/nubs for interfacing with a landing surface, in accordance with an example embodiment of the present disclosure.

FIG. 4C is an illustration of an aerial drone with a landing gear including raised points (e.g., downward facing conical or pyramid-like elements) for interfacing with a landing surface, in accordance with an example embodiment of the present disclosure.

FIG. 4D is an illustration of an aerial drone with a landing gear including feet/nubs extending from the aerial drone's motors for interfacing with a landing surface, in accordance with an example embodiment of the present disclosure.

FIG. 4E is an illustration of an aerial drone with a cage-like landing gear for interfacing with a landing surface, in accordance with an example embodiment of the present disclosure.

FIG. 5A is an illustration of a one-dimensional optical sensor for an aerial drone, in accordance with an example embodiment of the present disclosure.

FIG. 5B is an illustration of a one-dimensional optical sensor for an aerial drone, in accordance with an example embodiment of the present disclosure.

FIG. 5C is an illustration of a two-dimensional optical sensor for an aerial drone, in accordance with an example embodiment of the present disclosure.

FIG. 5D is an illustration of a two-dimensional optical sensor for an aerial drone, in accordance with an example embodiment of the present disclosure.

FIG. 7B is an illustration of an aerial drone with an optical sensor configured to scan identifiers at a first height based on a flight path of the aerial drone, where the optical sensor misses an identifier located at a second height different from the first height, in accordance with an example embodiment of the present disclosure.

FIG. 8A is an illustration of an aerial drone with an optical sensor and a camera having a wider field of view than the optical sensor, in accordance with an example embodiment of the present disclosure.

FIG. 10A is an illustration of an aerial drone with an optical sensor that is actuatable along or about at least one axis, wherein the optical sensor is actuatable along or about a first and a second axis to detect identifiers at a plurality of different scanning heights, in accordance with an example embodiment of the present disclosure.

FIG. 11A is an illustration of an aerial drone with an optical sensor configured to scan identifiers based on a flight path of the aerial drone, in accordance with an example embodiment of the present disclosure.

FIG. 11B is an illustration of an aerial drone with an optical sensor configured to scan identifiers based on a flight path of the aerial drone, where the optical sensor fails to detect an identifier when the aerial drone does not maintain an alignment between the optical sensor and the identifier for a sufficient time period, in accordance with an example embodiment of the present disclosure.

FIG. 11C is an illustration of an aerial drone with an optical sensor configured to scan identifiers based on a flight path of the aerial drone, wherein the aerial drone is configured to maintain an alignment between the optical sensor and a first identifier for a predetermined time period or until the first identifier is recognized prior to the aerial drone moving on to scan a second identifier, in accordance with an example embodiment of the present disclosure.

FIG. 12A is an illustration of an aerial drone with an optical sensor mounted to an upper surface of the aerial drone, in accordance with an example embodiment of the present disclosure.

FIG. 12B is an illustration of an aerial drone with an optical sensor mounted to a structure including raised platform on an upper surface of the aerial drone, in accordance with an example embodiment of the present disclosure.

FIG. 12C is an illustration of an optical sensor for an aerial drone, wherein the optical sensor is actuatable along or about a first axis, in accordance with an example embodiment of the present disclosure.

FIG. 12D is an illustration of an optical sensor for an aerial drone, wherein the optical sensor is actuatable along or about a first and a second axis, in accordance with an example embodiment of the present disclosure.

FIG. 20 is an illustration of a system including an aerial drone with an optical sensor configured to scan identifiers based on a flight path of the aerial drone and a device having a user interface for receiving a flight path input for an aerial drone, wherein the flight path input comprises a distance for the aerial drone to travel before stopping or turning around, in accordance with an example embodiment of the present disclosure.

FIG. 21A is an illustration of a system including an aerial drone with an optical sensor configured to scan identifiers based on a flight path of the aerial drone, wherein the aerial drone is configured to detect a recognizable portion (e.g., an end) of an aisle before stopping or changing direction, in accordance with an example embodiment of the present disclosure.

FIG. 24 is an illustration of a system including an aerial drone with an optical sensor configured to scan identifiers based on a flight path of the aerial drone, wherein a position of the aerial drone is detected based on a triangulation algorithm using signals transmitted to the aerial drone by a plurality of wireless transmitters or transceivers, in accordance with an example embodiment of the present disclosure.

FIG. 29B is a block diagram illustrating a WMS in communication with an aerial drone, such as the aerial drone in any of the embodiments illustrated by FIGS. 1A through 28, in accordance with an example embodiment of the present disclosure.

FIG. 29C is a table of values populated by a WMS, the values corresponding to identifiers of inventory items detected by an aerial drone, such as the aerial drone in any of the embodiments illustrated by FIGS. 1A through 28, in accordance with an example embodiment of the present disclosure.

FIG. 30A is a graphical user interface generated by a WMS based on information associated with identifiers of inventory items detected by an aerial drone, such as the aerial drone in any of the embodiments illustrated by FIGS. 1A through 28, wherein the graphical user interface includes a mapping of the inventory items, in accordance with an example embodiment of the present disclosure.

DETAILED DESCRIPTION

Overview

Figure 1E:
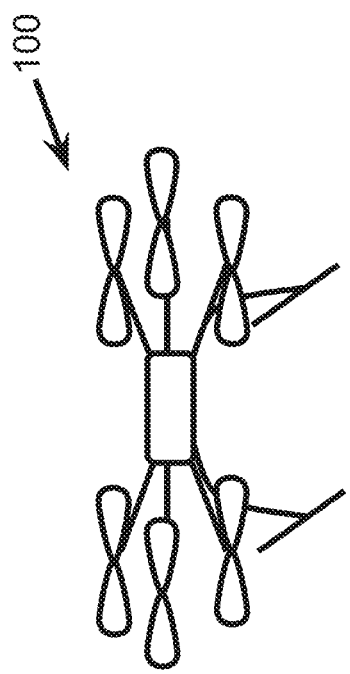
FIG. 1E is an illustration of an aerial drone, in accordance with an example embodiment of the present disclosure.

The present disclosure relates to an inventory management system (e.g., warehouse inventory management system) that employs at least one aerial drone to scan identifiers of inventory items stored within a storage facility (e.g., warehouse), a manufacturing facility, and/or within a shopping facility, or the like. The system includes at least one aerial drone with an optical sensor (e.g., a laser scanner, photodetector array, camera, any combination thereof, or the like), an indoor positioning system (e.g., a triangulation based indoor positioning system, a light ranging and detection based indoor positioning system, or an indoor positioning system based on camera or LIDAR sensor systems coupled with a processor running simultaneous localization and mapping or visual-inertial odometry algorithms), and a controller on the aerial drone. The controller is communicatively coupled to the optical sensor and the indoor positioning system. The controller is configured to localize and navigate the aerial drone within a facility based on one or more signals from the indoor positioning system. The controller is further configured to detect identifiers attached to respective inventory items via the optical sensor and to store information associated with the detected identifiers in an onboard memory.

The controller can be configured to implement a flight path or several flight paths for the aerial drone. For example, the controller can implement a static flight path (e.g., a fully predetermined flight path through a storage facility) or a dynamic flight path (e.g., a flight path that at least partially changes based on one or more inputs (e.g., user inputs, detected position, detected markers/reference points, detected identifiers, etc.)).

In an example where the controller implements a dynamic flight path, the system can include a camera or multiple cameras (in addition to the optical sensor) on the aerial drone. The camera can have a wider field of view than the field of view of the optical sensor, which may also be a camera in some implementations. The controller may be configured to capture image data for a plurality of inventory items (e.g., an image, multiple images, or video footage of several adjacent inventory items) via the camera. The controller may be further configured to detect locations of the identifiers for the plurality of inventory items based on the image data, using image processing, computer vision, machine learning, and/or other algorithms, and configured to generate a flight path for the aerial drone based on the detected locations of the identifiers in order to cause the optical sensor to align with and detect respective ones of the identifiers. For example, the flight path generated by the controller may take into account differences in height of a first identifier of a first inventory item relative to a second identifier of a second inventory item that is adjacent to the first inventory item. The controller can also be configured to update the flight path based on detected differences in orientation, horizontal position (e.g., left, right, or center placement of the identifier on a respective inventory item), and so forth.

The system may include at least one actuator coupled to the optical sensor. For example, the system may include one, two, or possibly three or more actuators configured to actuate the optical sensor along or about at least one axis (or two axes (e.g., x and y), or three axes (e.g., x, y, and z) axes) in order to cause the optical sensor to align with and detect respective ones of the identifiers. In this regard, the controller can be configured to cause the actuator to reposition the optical sensor in addition to or instead of repositioning the aerial drone itself. Alternatively or additionally, the system can include a plurality of optical sensors having differing orientations (e.g., aimed at different heights when the aerial drone is in proximity to an inventory item) so that at least one of the optical sensors is capable of detecting an identifier regardless of its position on the inventory item.

In some embodiments, the controller is configured to implement a stop-and-go flight path to detect identifiers attached to respective inventory items via the optical sensor. For example, the controller can be configured to detect a first identifier of a first inventory item via the optical sensor. The controller is then configured to cause the aerial drone to maintain an alignment between the optical sensor and the first identifier for a predetermined time period or until the first identifier is recognized (e.g., until the detected identifier is successfully correlated with an identifier from a list of stored identifiers and/or until a threshold data set for the inventory item can be determined/derived from the detected identifier). The controller may be configured to cause the aerial drone to align the optical sensor with a second identifier of a second inventory item after the predetermined time period or after the first identifier is recognized.

The aerial drone may be configured to scan identifiers for inventory items located on both sides (e.g., on opposing, inward facing sides) of an aisle. For example, the controller may be configured to cause the aerial drone to follow a zig-zag flight path such that the optical sensor detects identifiers of inventory items located one side of each aisle of a plurality of aisles prior to reaching an end of the plurality of aisles. The aerial drone can then turn around (e.g., rotate about 180 degrees) and perform the same flight path in an opposite direction in order to scan identifiers of the inventory items located on the other side of each aisle of the plurality of aisles. In another example implementation, the aerial drone has at least a second optical sensor on the aerial drone. The second optical sensor can be oriented such that it faces an opposite direction relative to the optical sensor (e.g., the first optical sensor and the second optical sensor generally face away from one another). The controller can be configured to implement a flight path down an aisle, wherein the first optical sensor and the second optical sensor are configured to align with and detect identifiers of inventory items located on opposing sides of the aisle prior to reaching an end of the aisle. The first optical sensor and the second optical sensor may be configured to perform detections simultaneously, at least partially in parallel, or immediately after one another.

The system can employ markers to indicate respective endpoints of aisles and/or other reference points. For example, a marker can comprise a mobile device (e.g., a smartphone, a tablet, etc.) configured to display a visual indicator or transmit a wireless signal that is detectable by the aerial drone (e.g., using the optical sensor or another sensor, wireless transceiver, or the like). In another example implementation, a marker can comprise a recognizable object (e.g., a pylon, flag, colored/patterned fiducial marker, indicator light, etc.). In another example implementation, a marker can comprise a wireless transmitter or transceiver (e.g., RFID tag, Bluetooth beacon, WiFi or ZigBee transmitter/transceiver, ultra-wideband (UWB) transmitter/transceiver, radio frequency (RF) transmitter/transceiver, or the like). Any number or combination of markers can be implemented throughout the system.

In some embodiments, the aerial drone has an indoor positioning system communicatively coupled to the controller. For example, the positioning system can include a camera-based positioning system, a triangulation based (e.g., laser or RF) positioning system, a light detection and ranging (LIDAR) positioning system, a camera-based simultaneous localization and mapping (SLAM) positioning system, inertial tracking system, or the like, and any combination thereof. The controller can be configured to determine a position of the aerial drone based on one or more signals from the positioning system. The controller may be further configured to associate the determined position with a detected identifier. For example, the controller can be configured to store respective positions for the detected identifiers. The controller can also be configured to determine the flight path for the aerial drone based upon the determined position of the aerial drone and/or a determined position of the aerial drone relative to one or more markers or other reference points.

The controller and associated circuitry/components (e.g., a graphics processor or the like) can be configured to perform an image processing algorithm on an image of an identifier and/or text, symbols, drawings, or pictures associated with the identifier to implement machine learning or computer vision functionalities. For example, the controller can be configured to detect the identifier and capture an image of an identifier with the optical sensor and/or a camera on the aerial drone. The controller can then perform an image processing algorithm on the image to detect at least one recognizable feature of the identifier and/or text, symbols, drawings, or pictures associated with the identifier (e.g., using a processor of the controller and/or a graphics processor communicatively coupled to the controller).

The aerial drone can be configured to communicate with a warehouse management system (WMS) that stores inventory data for the storage facility. In embodiments, the WMS may include, but is not limited to, an onsite computer/server, a network of onsite computers/servers, a remote computer/server, a network of remote computers/servers, a cloud computing network, a network accessible by one or more mobile devices, or any combination of the foregoing. The controller may be configured to transmit information associated with the detected identifiers to the WMS. The WMS can have an onsite user interface and/or can be configured to transmit information for display via a user interface of a connected device (e.g., a computer, mobile device, or the like). In some embodiments, the WMS is configured to generate a graphical user interface (e.g., for display via the user interface of the WMS, or the user interface of a connected device). The graphical user interface generated by the WMS can include a mapping of a plurality of inventory items. The graphical user interface can be configured to receive user inputs (e.g., data entries, selections, etc.) via an I/O device (e.g., keyboard, mouse, touch panel, microphone (e.g., for voice commands), and the like). In response to receiving a selection of an inventory item of the plurality of mapped inventory items, the WMS may be configured to cause the graphical user interface to display information corresponding to the selected inventory item based on information received from the aerial drone.

Example Implementations

Figure 1D:
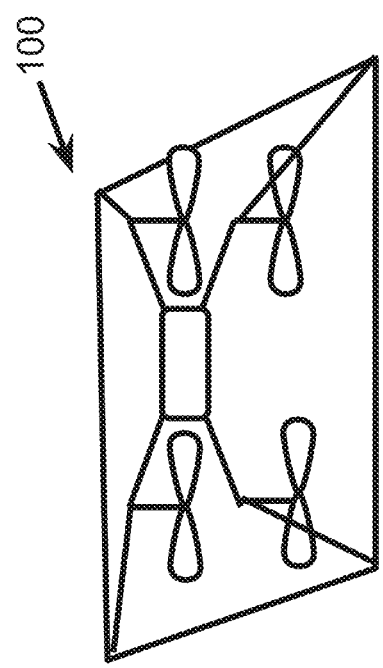
FIG. 1D is an illustration of an aerial drone, in accordance with an example embodiment of the present disclosure.
Figures 3A, 3B:
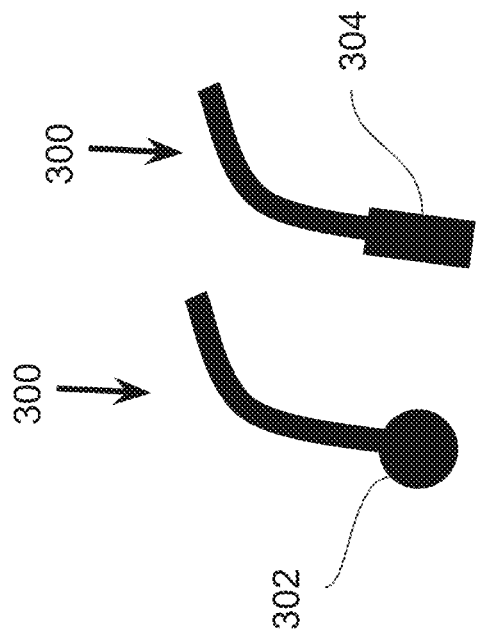
FIG. 3A is an illustration of a landing gear footing for an aerial drone, in accordance with an example embodiment of the present disclosure.
FIG. 3B is an illustration of a landing gear footing for an aerial drone, in accordance with an example embodiment of the present disclosure.
Figures 2A, 2B, 2C:
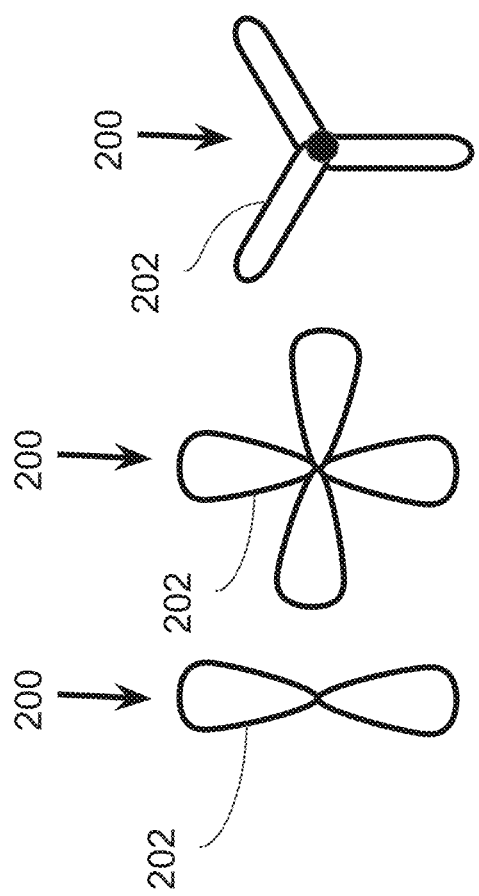
FIG. 2A is an illustration of a propeller for an aerial drone, in accordance with an example embodiment of the present disclosure.
FIG. 2B is an illustration of a propeller for an aerial drone, in accordance with an example embodiment of the present disclosure.
FIG. 2C is an illustration of a propeller for an aerial drone, in accordance with an example embodiment of the present disclosure.

FIGS. 1A through 1E illustrate several types of aerial drones 100 that can be employed by a warehouse inventory management system, in accordance with various embodiments of this disclosure. For example, the aerial drone 100 can be, but is not limited to, a blimp (e.g., as shown in FIG. 1A), a quadcopter with upward and downward facing propellers (e.g., as shown in FIG. 1B), which may also be referred to as an octocopter because it has eight propellers, a quadcopter with upward facing propellers (e.g., as shown in FIG. 1C), a quadcopter with downward facing propellers (e.g., as shown in FIG. 1D), a hexacopter (e.g., as shown in FIG. 1E), or the like. Examples of propeller types are shown in FIGS. 2A through 2C (e.g., a propeller 200 with two fins 202 shown in FIG. 2A, a propeller 200 with four fins 202 shown in FIG. 2B, a propeller 200 with three fins 202 shown in FIG. 2C). Examples of landing gear footings 300 are shown in FIGS. 3A and 3B (e.g., with a deformable (cushion-like) or non-deformable ball 302 shown in FIG. 3A, with a deformable (cushion-like) or non-deformable cylindrical footing 304 shown in FIG. 3B). Examples of landing gear configurations are shown in FIGS. 4A through 4E, in particular: FIG. 4A shows an example embodiment of an aerial drone with a landing gear 400 including horizontal bars for interfacing with a landing surface (e.g., ground, raised platform, building structure, shelf, etc.); FIG. 4B shows an example embodiment of an aerial drone with a landing gear 402 including feet/nubs for interfacing with a landing surface; FIG. 4C shows an example embodiment of an aerial drone with a landing gear 404 including raised points (e.g., downward facing conical or pyramid-like elements) for interfacing with a landing surface; FIG. 4D shows an example embodiment of an aerial drone with a landing gear 406 including feet/nubs extending from the aerial drone's motors (e.g., below propellers 200) for interfacing with a landing surface; and FIG. 4E shows an example embodiment of an aerial drone with a cage-like landing gear 408 for interfacing with a landing surface. The foregoing embodiments are provided by way of example, and it is contemplated than any aerial drone configuration having any number/type of propellers, landing gear, etc., can be implemented without departing from the scope of this disclosure.

Figure 1F:
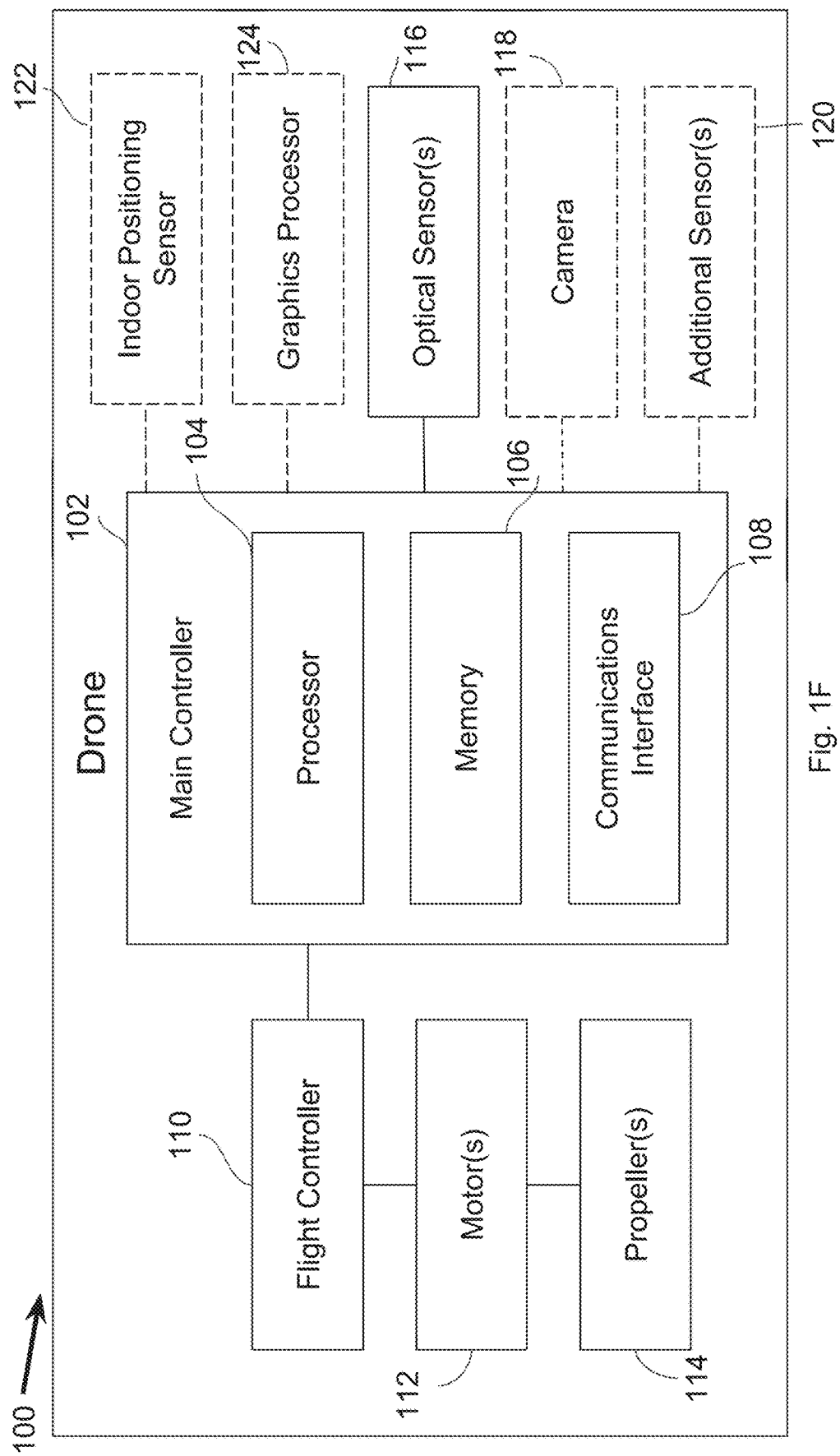
FIG. 1F is a block diagram illustrating electronics for an aerial drone, in accordance with an example embodiment of the present disclosure.

Various components that can be coupled to, integrated within a structure of, or otherwise onboard the aerial drone 100 are illustrated in FIG. 1F. In embodiments, the aerial drone 100 has at least one controller (e.g., main/central controller 102 and/or flight controller 110). For example, the main controller 102 can be configured to provide communication and processing functionality for the aerial drone 100, while the flight controller 100 is configured to receive instructions from the main controller 102 and drive one or more motors 112 accordingly. The aerial drone 100 may have a number of motors 112 coupled to respective propellers 114. In another embodiment, the main controller 102 can implement flight controller 110 operations and drive the motors 112 directly, or the flight controller 110 can comprise the main controller 102, or vice versa.

Controller 102 (and/or flight controller 110) can include a processor 104, a memory 106, and a communications interface 108. The processor 104 provides processing functionality for the controller 102/drone 100 (or components thereof) and can include any number of microprocessors, digital signal processors, micro-controllers, circuitry, field programmable gate array (FPGA) or other processing systems, and resident or external memory for storing data, executable code, and other information accessed or generated by the controller 102/drone 100. The processor 104 can execute one or more software programs embodied in a non-transitory computer readable medium that implement techniques described herein. The processor 104 is not limited by the materials from which it is formed or the processing mechanisms employed therein and, as such, can be implemented via semiconductor(s) and/or transistors (e.g., using electronic integrated circuit (IC) components), and so forth.

The memory 106 can be an example of tangible, computer-readable storage medium that provides storage functionality to store various data and or program code associated with operation of the controller 102/drone 100, such as software programs and/or code segments, or other data to instruct the processor 104, and possibly other components of the controller 102/drone 100, to perform the functionality described herein. Thus, the memory 106 can store data, such as a program of instructions (e.g., software module(s)) for operating the controller 102/drone 100 (including its components), and so forth. It should be noted that while a single memory 106 is described, a wide variety of types and combinations of memory (e.g., tangible, non-transitory memory) can be employed. The memory 106 can be integral with the processor 104, can comprise stand-alone memory, or can be a combination of both.

Some examples of the memory 106 can include removable and non-removable memory components, such as random-access memory (RAM), read-only memory (ROM), flash memory (e.g., a secure digital (SD) memory card, a mini-SD memory card, and/or a micro-SD memory card), magnetic memory, optical memory, universal serial bus (USB) memory devices, hard disk memory, external memory, and so forth. In implementations, the controller 102/drone 100 and/or the memory 106 can include removable integrated circuit card (ICC) memory, such as memory provided by a subscriber identity module (SIM) card, a universal subscriber identity module (USIM) card, a universal integrated circuit card (UICC), and so on.

The communications interface 108 can be operatively configured to communicate with components of the controller 102/drone 100. For example, the communications interface 108 can be configured to retrieve data from storage in the controller 102/drone 100, transmit data for storage in the controller 102/drone 100, and so forth. The communications interface 108 can also be communicatively coupled with the processor 104 to facilitate data transfer between components of the controller 102/drone 100 and the processor 104. It should be noted that while the communications interface 108 is described as a component of a controller 102/drone 100, one or more components of the communications interface 108 can be implemented as external components communicatively coupled to the controller 102/drone 100 via a wired and/or wireless connection. The controller 102/drone 100 can also be configured to connect to one or more input/output (I/O) devices via the communications interface 108 and/or via direct or indirect communicative coupling with the processor 104. In an embodiment shown in FIG. 1F, the controller 102 is communicatively coupled to at least one optical sensor 116 (e.g., a laser scanner, photodetector array, camera, any combination thereof, or the like) on the drone 100. In some embodiments, the drone 100 further includes a camera 118 (e.g., a camera having a wider field of view than the optical sensor 116), one or more additional sensors 120 (e.g., temperature sensors, inertial sensors, altitude detectors, LIDAR devices, laser depth sensors, radar/sonar devices, wireless receivers/transceivers, RFID detectors, etc.), an indoor position determining system 122 (e.g., camera vision based SLAM positioning system employing one or more monocular cameras, one or more stereoscopic camera, one or more laser depth sensors, one or more LIDAR devices, laser and/or ultrasonic rangefinders, an inertial sensor based positioning system, an RF/WIFI/Bluetooth triangulation based sensor system, or the like), a graphics processor 124 (e.g., to provide processing functionality for the indoor positioning system 122, and/or to implement optical character recognition (OCR), machine learning, computer vision, or any other image processing algorithm(s)), any combination thereof, and so forth. The controller 102 can be configured to utilize sensor inputs to detect identifiers on inventory items and/or other information (e.g., contextual information (e.g., location of an inventory item, time, temperature, humidity, pressure, etc.) or product information (e.g., label information for the inventory item, expiration information, production date, environmental tolerances, quantity, size/volume, product weight (if printed on the inventory item), etc.), navigate the drone 100 (e.g., by avoiding obstacles, detecting reference points, updating a dynamic flight path for the drone 100), and to stabilize and/or localize its position.

Figure 29A:
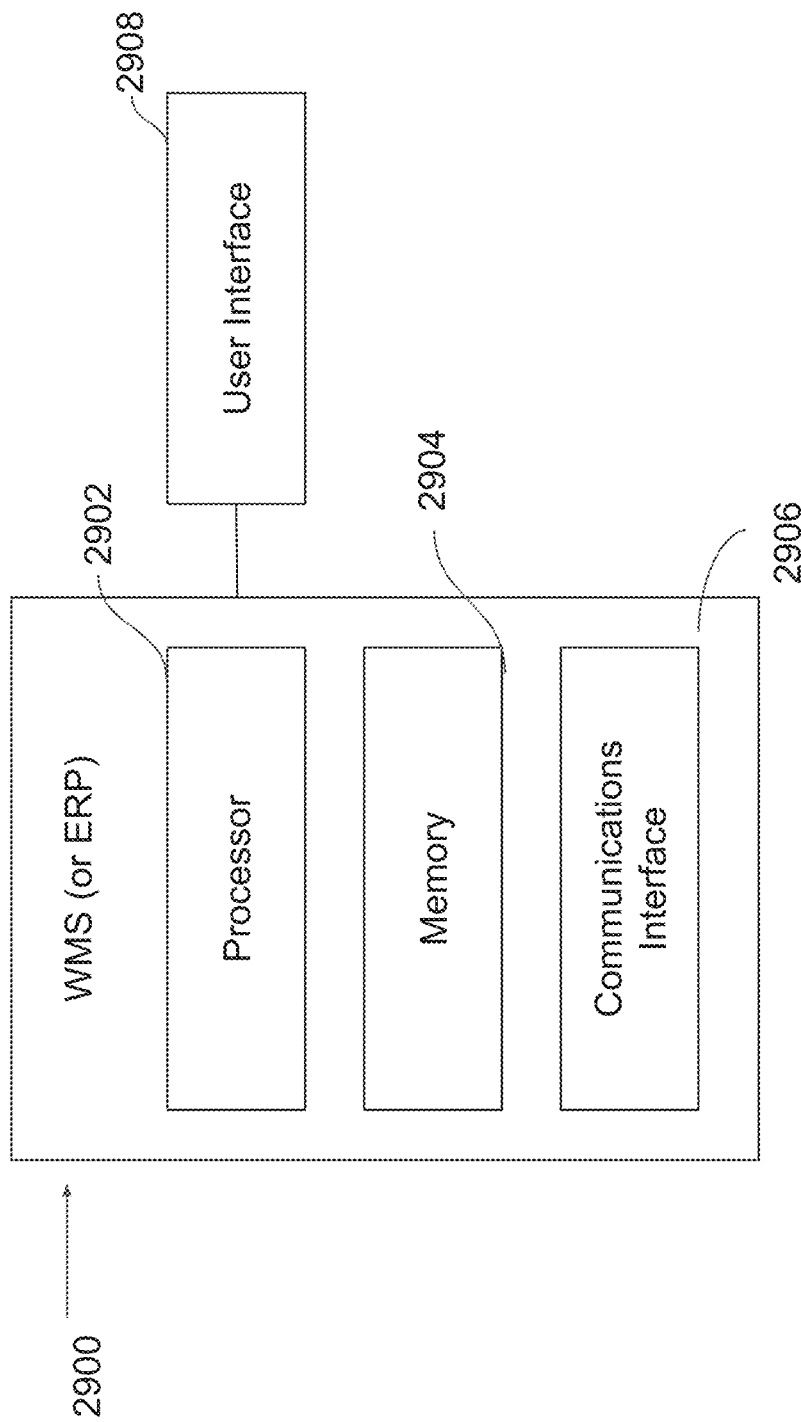
FIG. 29A is a block diagram illustrating a warehouse management system (WMS) (sometimes referred to as an enterprise resource planning system (ERP)) that is configured to communicate with an aerial drone, such as the aerial drone in any of the embodiments illustrated by FIGS. 1A through 28, in accordance with an example embodiment of the present disclosure.

The communications interface 108 and/or the processor 104 can be configured to communicate with a variety of different networks, such as near-field communication (NFC) networks, a wide-area cellular telephone network, such as a cellular network, a 3G cellular network, a 4G cellular network, or a global system for mobile communications (GSM) network; a wireless computer communications network, such as a WiFi network (e.g., a wireless local area network (WLAN) operated using IEEE 802.11 network standards); an ad-hoc wireless network, an internet; the Internet; a wide area network (WAN); a local area network (LAN); a personal area network (PAN) (e.g., a wireless personal area network (WPAN) operated using IEEE 802.15 network standards); a public telephone network; an extranet; an intranet; and so on. However, this list is provided by way of example only and is not meant to limit the present disclosure. Further, the communications interface 108 can be configured to communicate with a single network or multiple networks across different access points. In an embodiment, a communications interface 108 can transmit information from the controller 102/drone 100 to an external device (e.g., mobile device, a computer connected to a network, cloud storage, server, etc.). For example, as shown in FIGS. 29A through 29C and further described below, the communications interface 108 may be configured to transmit information from the controller 102/drone 100 to a warehouse management system (WMS) 2900 (sometimes referred to as an enterprise resource planning (ERP) system) for storing and/or updating information based on the information transmitted by the controller 102/drone 100. In another embodiment, a communications interface 108 can receive information from an external device (e.g., a mobile device, a computer connected to a network, cloud computing/storage network, etc.). For example, the communication interface 120 may be further configured to receive information from the WMS 2900 (e.g., requests for data, control or flight path information, etc.).

The aerial drone 100 includes at least one optical sensor 116 configured to detect identifiers on inventory items (e.g., labeling information, such as, but not limited to, shipping labels, packaging labels, text, images, barcodes, combinations thereof, and the like). Examples of inventory items include warehouse objects, such as, but not limited to, boxes, pallets, cartons, packages, and cases; although other labeling information may be located on warehouse structures, such as aisles, shelves, signs, floors, paths, and so forth. In example embodiments shown in FIGS. 5A through 5D, the optical sensor 116 may include an optical scanner 500 (e.g., laser scanner or other light-based scanner). FIG. 5A shows a one-dimensional scanner 500 configured to scan an identifier 504 (e.g., barcode) on an inventory item 502. As shown in FIG. 5B, the one-dimensional scanner 500 must have a scanning orientation that corresponds to the orientation of the identifier 504 (e.g., both in portrait or both in landscape orientation); otherwise the one-dimensional scanner 500 is unable to recognize the identifier 504. In another embodiment shown FIGS. 5C and 5D, the scanner 500 is a two-dimensional scanner 500. The two-dimensional scanner 500 can successfully detect the identifier 504 regardless of the orientation or tilt angle of the identifier 504. In this regard, employing a multi-dimensional (e.g., two or more dimension) scanner 500 can be advantageous.

Figure 6A:
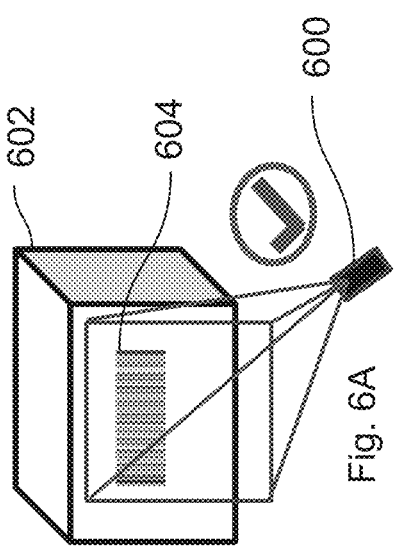
FIG. 6A is an illustration of an image-based optical sensor for an aerial drone, in accordance with an example embodiment of the present disclosure.
Figure 6C:
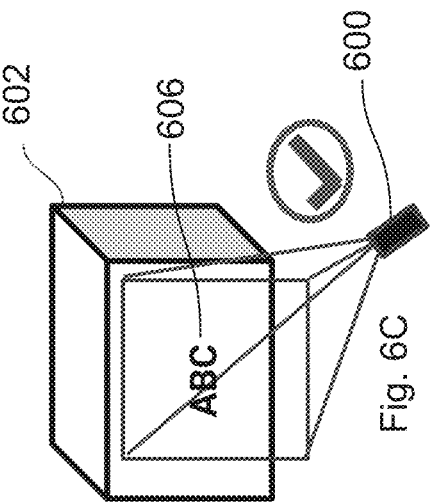
FIG. 6C is an illustration of an image-based optical sensor for an aerial drone, in accordance with an example embodiment of the present disclosure.
Figure 6B:
FIG. 6B is an illustration of an identifier having one or more elements detectable by an image-based optical sensor for an aerial drone, in accordance with an example embodiment of the present disclosure.

Referring now to FIGS. 6A through 6C, identifiers printed on inventory items 602 can include patterned elements 604 (e.g., one-dimensional barcodes, two-dimensional codes such as QR codes, or the like) as shown in FIG. 6A, printed symbols or alphanumeric characters 606 (e.g., numbers and letters) as shown in FIG. 6C, or a combination thereof (e.g., as shown in FIG. 6B). In some embodiments, the optical sensor 116 can include an image-based sensor 600 (e.g., a camera or a scanning array of photodetectors) that is configured to capture an image of the identifier (e.g., patterned element 604 and/or alphanumeric character/symbol 606) on the inventory item 602. The controller 102 can be configured to perform an image processing algorithm on the image (e.g., an OCR algorithm) to recognize the identifier 604/606 and/or derive information from the detected identifier, product information, and so forth.

Figure 7A:
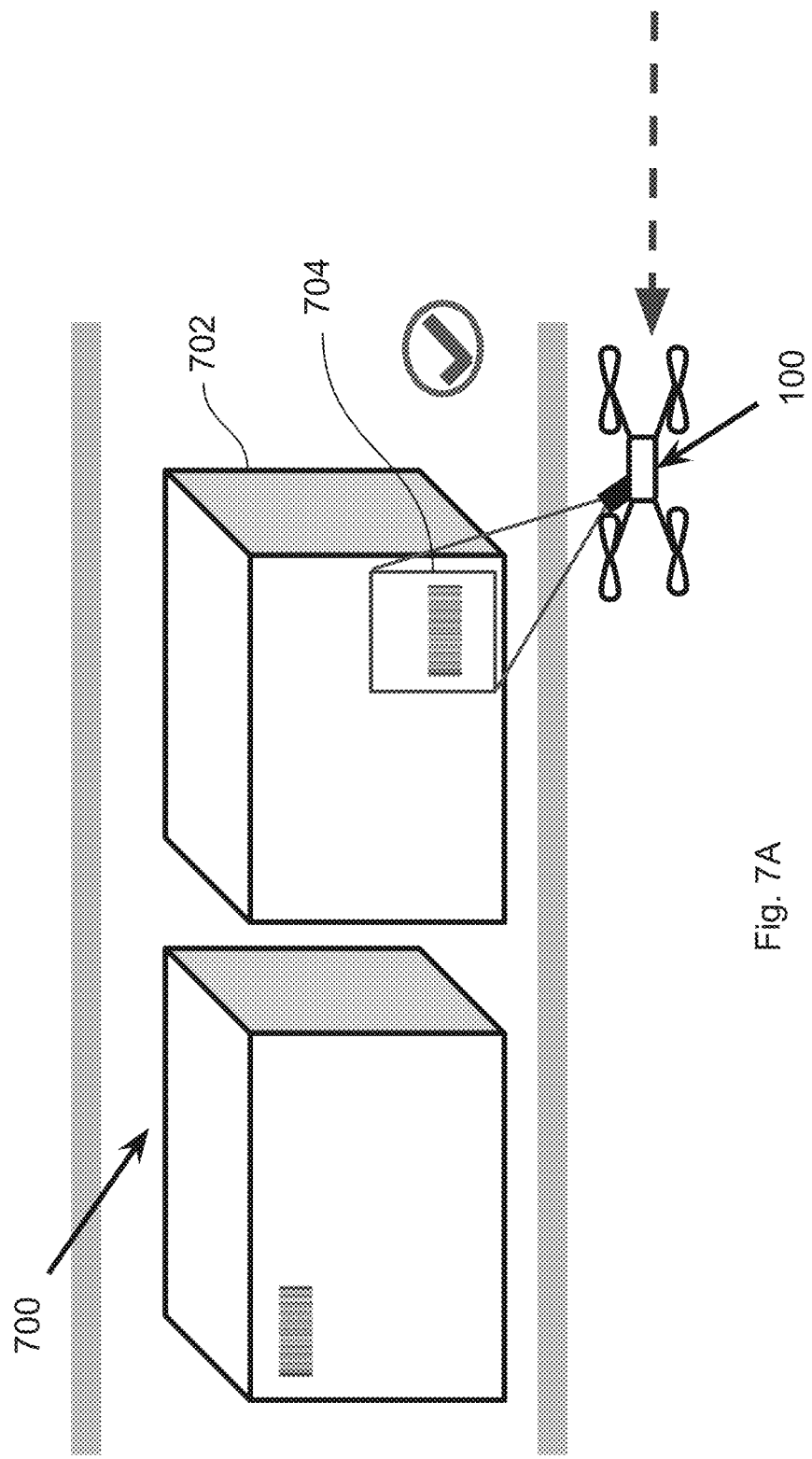
FIG. 7A is an illustration of an aerial drone with an optical sensor configured to scan identifiers at a first height based on a flight path of the aerial drone, in accordance with an example embodiment of the present disclosure.

FIGS. 7A and 7B demonstrate a problem that may be encountered when the aerial drone 100 is scanning identifiers 704 of inventory items 702 in a storage facility 700. As shown in FIG. 7A, the aerial drone 100 can be configured to scan (e.g., with optical sensor 116) identifiers 704 at a first height based on a flight path of the aerial drone 100. However, as shown in FIG. 7B, the aerial drone 100 may miss an identifier 704 on a subsequent inventory item 702 if the identifier is positioned at a different height than the first identifier. That is, the flight path of the aerial drone 100 might not account for differences in positioning of identifiers 704 on inventory items 702, and as a result, some identifiers 704 may not be detected.

Figure 8B:
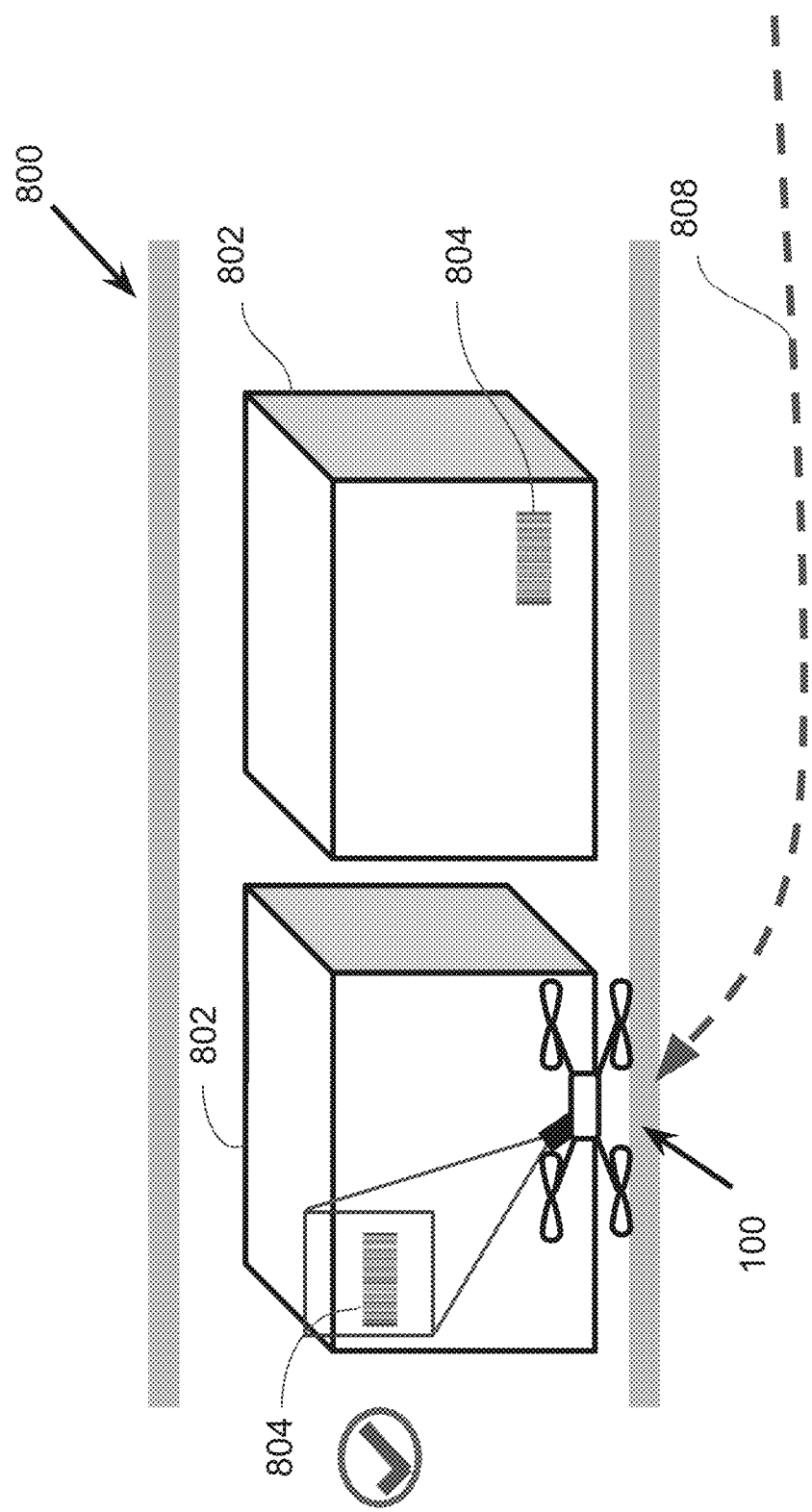
FIG. 8B is an illustration of an aerial drone with an optical sensor and a camera having a wider field of view than the optical sensor, wherein the aerial drone is configured to follow a flight path based on image data from the camera, in accordance with an example embodiment of the present disclosure.

FIGS. 8A and 8B show an embodiment of the aerial drone 100 that accounts for differences in positioning of identifiers 804 on inventory items 802. For example, FIG. 8A shows a storage facility 800 where inventory items 802 have identifiers 804 located at different respective heights. The aerial drone 100 can optionally include a camera 118 (e.g., as shown in FIG. 1F) that has a wider field of view than the field of view of the optical sensor 116. The controller 102 can be configured to capture image data for a plurality of inventory items 802 (e.g., an image, multiple images, or video footage of several adjacent inventory items 802) via the camera 118. The controller 102 can be further configured to detect locations (e.g., x, y, and/or z coordinates) of the identifiers 804 for the plurality of inventory items 802 based on the image data and configured to generate a flight path 808 (which may be an updated version of an original flight path 806) for the aerial drone based on the detected locations of the identifiers 804 in order to cause the optical sensor 116 to align with and detect respective ones of the identifiers 804 (e.g., as shown in FIG. 8B). For example, the flight path 808 generated by the controller 102 may take into account differences in height of a first identifier of a first inventory item relative to a second identifier of a second inventory item that is adjacent to the first inventory item. The controller can also be configured to update the flight path 806/808 based on detected differences in orientation, horizontal position (e.g., left, right, or center placement of the identifier 804 on a respective inventory item 802), and so forth.

Figure 9B:
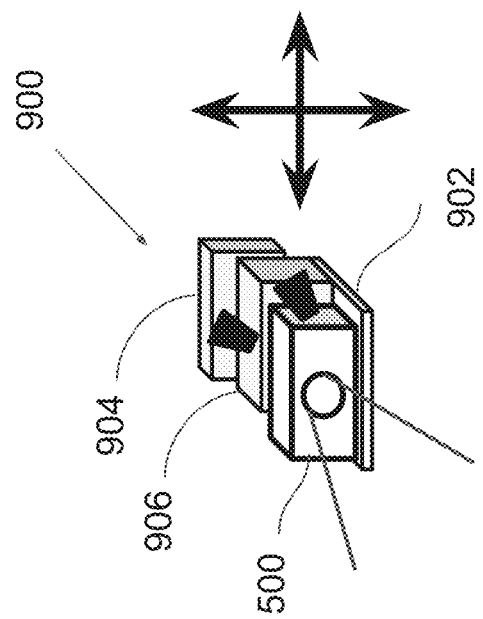
FIG. 9B is an illustration of an optical sensor for an aerial drone, wherein the optical sensor is actuatable along or about a first and a second axis, in accordance with an example embodiment of the present disclosure.
Figure 9A:
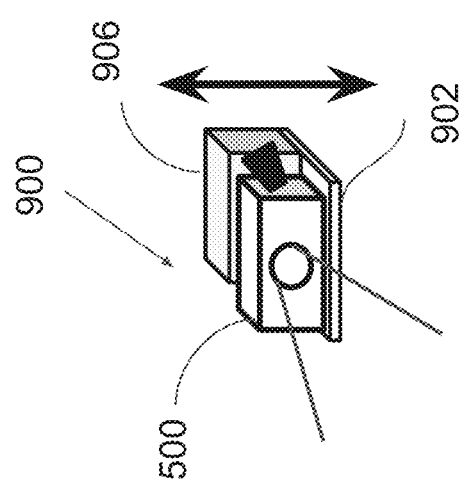
FIG. 9A is an illustration of an optical sensor for an aerial drone, wherein the optical sensor is actuatable along or about a first axis, in accordance with an example embodiment of the present disclosure.
Figure 10B:
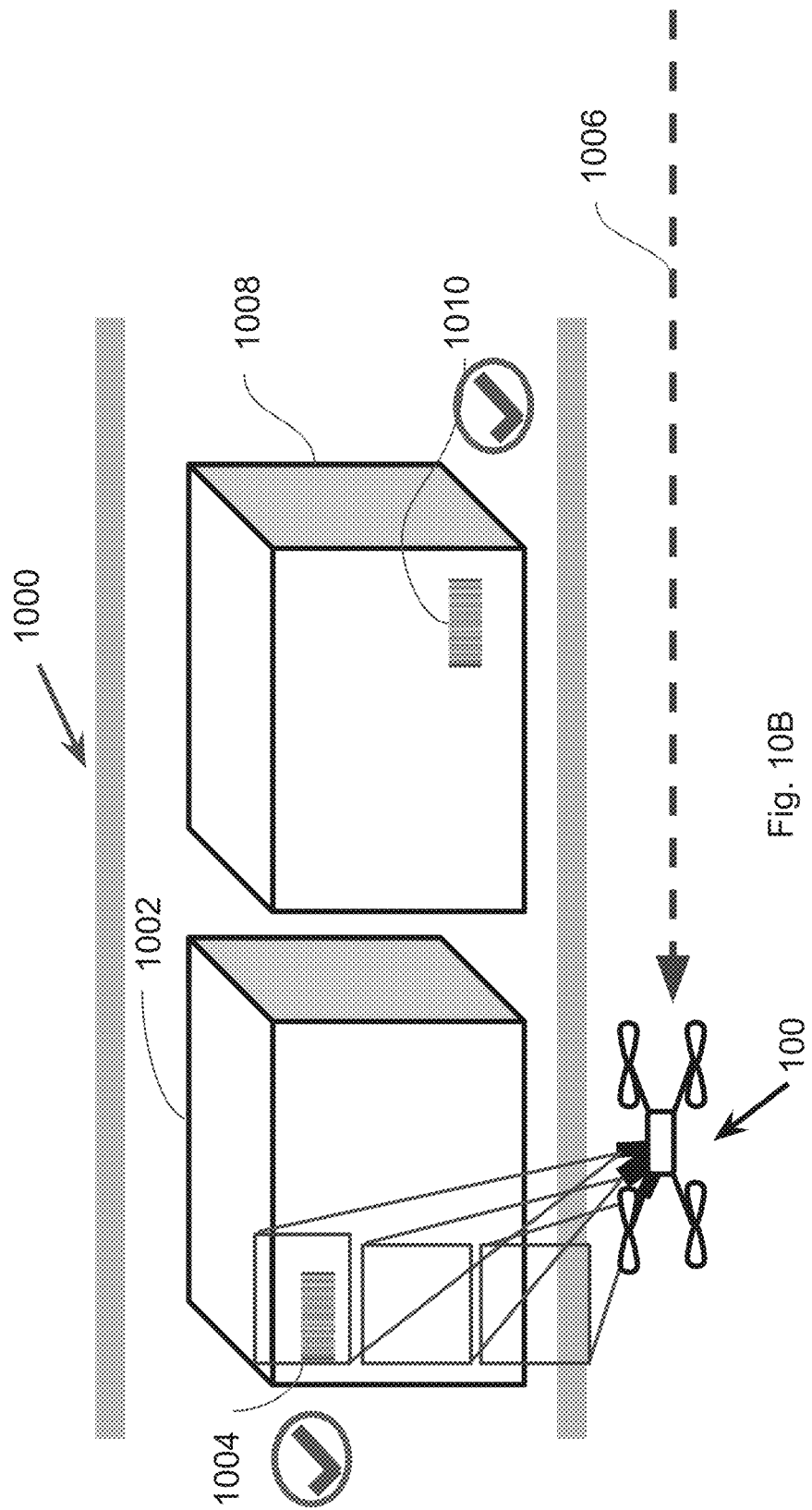
FIG. 10B is an illustration of an aerial drone with a plurality of optical sensor oriented at a plurality of different respective scanning heights, in accordance with an example embodiment of the present disclosure.

The aerial drone 100 can also be configured to account for differences in the positioning of identifiers on respective inventory items by employing at least one actuatable optical sensor (e.g., such as the actuatable sensor 900 shown in FIG. 9A or 9B). For example, the optical sensor 116 can include an actuatable optical sensor 900 having at least one actuator (e.g., actuator 904 and/or actuator 906) and a mechanical mount 902 that attaches the actuator (e.g., actuator 904 and/or actuator 906) to the optical sensor (e.g., scanner 500). Examples of an actuator can include, but are not limited to, a servo, stepper motor, linear actuator, electromagnetic actuator, or the like. The actuatable optical sensor 900 can include one actuator 902 (e.g., as shown in FIG. 9A), two actuators 902 and 904 (e.g., as shown in FIG. 9B, or possibly three or more actuators configured to actuate the optical sensor 900 along or about at least one axis (or two axes (e.g., x and y), or three axes (e.g., x, y, and z) axes) in order to cause the optical sensor 900 to align with and detect respective ones of the identifiers. In an example implementation, actuator 906 is a one-directional motor, such as a stepper motor or a servomotor, and actuator 904 is a multi-directional motor, such as a stepper motor or servomotor, but in a perpendicular direction from actuator 906 so as to give the actuatable optical sensor 900 an additional axis of motion. The controller 102 may be configured to cause the actuator (actuator 902 and/or 904) to reposition the optical sensor 900 in addition to or instead of repositioning the aerial drone 100 itself. For example, as shown in FIG. 10A, the aerial drone 100 can maintain a low flight path 1006 (e.g., at a predetermined and/or static height) through a storage facility 1000 and can be configured to detect identifiers 1004 of inventory items 1002 that are higher than identifiers 1010 of other inventory items 1008 by actuating the optical sensor 116 (e.g., actuatable optical sensor 900) of the aerial drone 100. As shown in FIG. 10B, the aerial drone 100 can alternatively or additionally include a plurality of optical sensors 116 having differing orientations (e.g., aimed at different heights when the aerial drone is in proximity to an inventory item 1002) so that at least one of the optical sensors 116 is capable of detecting an identifier 1004 regardless of its position on the inventory item 1002. In this regard, a first optical sensor 116 on the aerial drone 100 can be configured to detect an identifier 1010 at a first height on a respective inventory item 1008 and another optical sensor 116 on the aerial drone 100 can be configured to detect an identifier 1004 at a second height on a respective inventory item 1002, where the second height is greater than the first height.

FIGS. 11A and 11B demonstrate a problem that may be encountered when the aerial drone 100 is scanning identifiers 1104 of inventory items 1102 in a storage facility 1100. As shown in FIG. 11A, the aerial drone 100 can be configured to scan (e.g., with optical sensor 116) identifiers 1104 based on a flight path 1006 of the aerial drone 100. However, as shown in FIG. 11B, the aerial drone 100 may miss an identifier 1104 on an inventory item 1102 if the identifier 1104 cannot be recognized (e.g., the scanned identifier 1104 does not register) before the aerial drone 100 moves on to scan the next inventory item. In some embodiments, the controller 102 is configured to implement a flight path 1106 with a speed that is not greater than a maximum speed at which the optical sensor 116 can scan the identifier 1104, or the controller 102 may be configured to cause the aerial drone 100 to fly at the reduced speed when the aerial drone 100 is in proximity to an identifier 1104 and/or when the optical sensor 116 is used to detect the identifier 1104. In other embodiments, the controller 102 can be configured to implement a stop-and-go flight path 1106 (e.g., as shown in FIG. 11C) to detect identifiers (e.g., identifiers 1104 and 1112) attached to respective inventory items (e.g., inventory items 1102 and 1110) via the optical sensor 116. For example, the controller 102 can be configured to detect a first identifier 1104 of a first inventory item 1102 via the optical sensor 116. The controller 102 is then configured to cause the aerial drone 100 to maintain an alignment between the optical sensor 116 and the first identifier 1104 (e.g., by maintaining the current position of the aerial drone 100) for a predetermined time period or until the first identifier 1104 is recognized (e.g., until the detected identifier 1104 is successfully correlated with an identifier from a list of stored identifiers and/or until a threshold data set for the inventory item 1102 can be determined/derived from the detected identifier 1104). The controller 102 may be configured to cause the aerial drone 100 to fly to a second inventory item 1110 and align the optical sensor 116 with a second identifier 1112 of the second inventory 1110 item after the predetermined time period or after the first identifier 1104 is recognized.

In some embodiments, the optical sensor 116 includes a camera having a global shutter to reduce image blur from flying by an identifier 1104 too quickly. A global shutter camera may be used to instantaneously capture an image of an identifier 1104 with less image blur than a rolling shutter camera that captures image pixels sequentially, for example. Thus, the aerial drone 100 can employ an optical sensor 116 with a global shutter to improve readability of captured images of identifiers 1104, which may be especially useful in implementations where the controller 102 performs OCR analysis on the image.

Figure 12E:
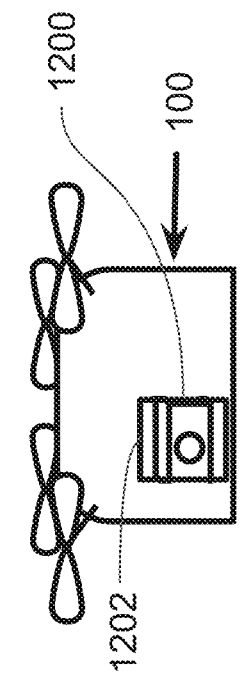
FIG. 12E is an illustration of an aerial drone with an optical sensor mounted to platform that protrudes from the aerial drone, in accordance with an example embodiment of the present disclosure.
Figure 12F:
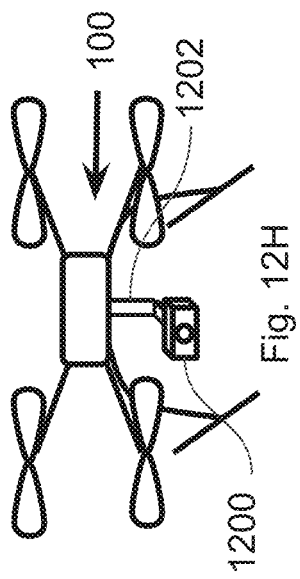
FIG. 12F is an illustration of an aerial drone with an optical sensor mounted at least partially within a structure that defines a body of the aerial drone, in accordance with an example embodiment of the present disclosure.
Figure 12G:
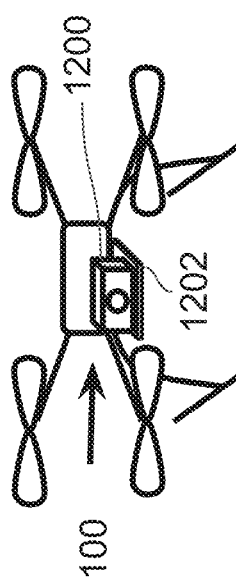
FIG. 12G is an illustration of an aerial drone with an optical sensor mounted to an lower surface of the aerial drone, in accordance with an example embodiment of the present disclosure.
Figure 12H:
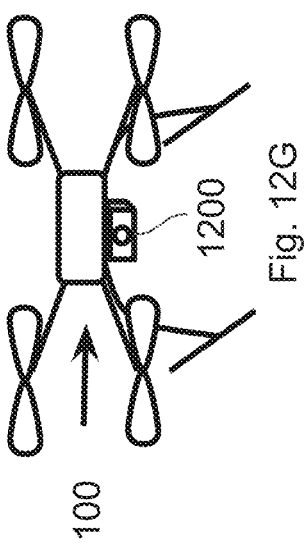
FIG. 12H is an illustration of an aerial drone with an optical sensor on a gimbal mounted to a lower surface of the aerial drone, in accordance with an example embodiment of the present disclosure.

The optical sensor 116 can be coupled to the aerial drone 100, integrated within a structure of the aerial drone 100, or otherwise disposed upon the aerial drone 100 in many ways. For example, the optical sensor 116 can include the optical sensor 1200 implemented on the aerial drone 100 in any of the configurations shown in FIGS. 12A through 12H. For example, FIG. 12A shows an embodiment of the aerial drone 100 with the optical sensor 1200 mounted to an upper surface of the aerial drone 100; FIG. 12B shows an embodiment of the aerial drone 100 with the optical sensor 1200 mounted to a mounting structure 1202 (e.g., a raised platform) on an upper surface of the aerial drone 100; FIG. 12E shows and embodiment of the aerial drone 100 with the optical sensor 1200 mounted to a mounting structure 1202 (e.g., a protruding platform/shelf) that protrudes from the aerial drone 100; FIG. 12F shows an embodiment of the aerial drone 100 with the optical sensor 1200 mounted at least partially within a mounting structure 1202 that defines a body portion of or an opening in a body portion of the aerial drone 100; FIG. 12G shows an embodiment of the aerial drone 100 with the optical sensor 1200 mounted to a lower surface of the aerial drone 100; and FIG. 12H shows an embodiment of the aerial drone 100 with the optical sensor 1200 coupled to a mounting structure 1202 (e.g., a gimbal) that suspends the optical sensor 1200 from a lower surface of the aerial drone 100. In embodiments (e.g., as shown in FIGS. 12C and 12D), the optical sensor 1200 can include at least one actuator (e.g., actuator 1204 and/or actuator 1206) configured to rotate or slide optical sensor 1200 in two or more directions. For example, the actuators 1204 and 1206 can include servos, stepper motors, linear actuators, electromagnetic actuators, or the like. In some embodiments, the optical sensor 1200 may include one actuator 1204 (e.g., as shown in FIG. 12C), two actuators 1204 and 1206 (e.g., as shown in FIG. 12D), or possibly three or more actuators configured to actuate the optical sensor 1200 along or about at least one axis (or two axes (e.g., x and y), or three axes (e.g., x, y, and z) axes) in order to cause the optical sensor 1200 to align with and detect identifiers on inventory items (e.g., as described above).

Figure 13C:
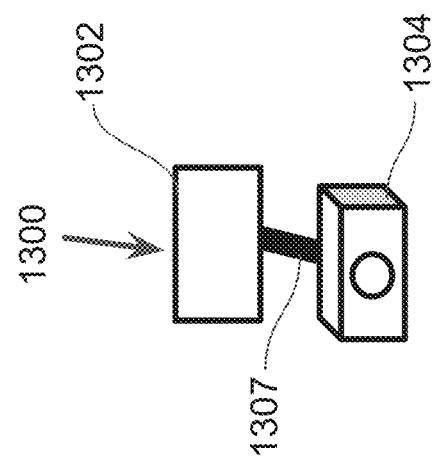
FIG. 13C is an illustration of an optical sensor configuration for an aerial drone, wherein the optical sensor is coupled to a controller by a combined data and power cable, in accordance with an example embodiment of the present disclosure.
Figure 13B:
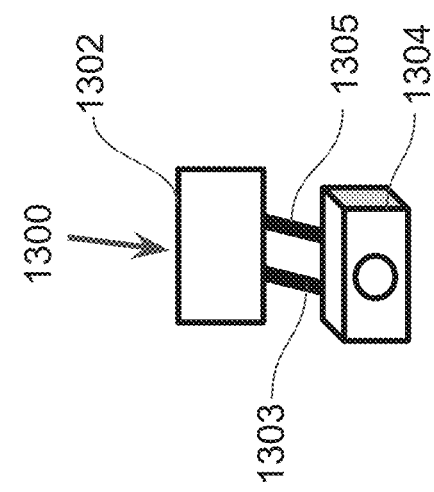
FIG. 13B is an illustration of an optical sensor configuration for an aerial drone, wherein the optical sensor is coupled to a controller by separate data and power cables, in accordance with an example embodiment of the present disclosure.
Figure 13A:
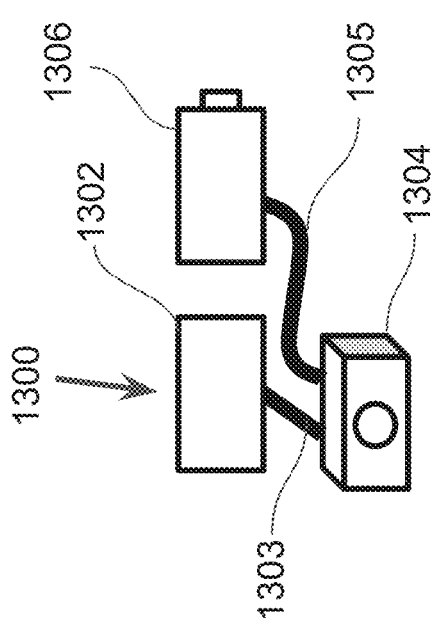
FIG. 13A is an illustration of an optical sensor configuration for an aerial drone, wherein the optical sensor is coupled to a controller and a battery by separate data and power cables, in accordance with an example embodiment of the present disclosure.

FIGS. 13A through 13C show various embodiments of an optical sensor 116 and/or camera 118 configuration for an aerial drone 100. For example, FIG. 13A shows a component assembly 1300 where an optical sensor 1304 (e.g., optical sensor 116) is coupled to a controller 1302 (e.g., controller 102) with a data cable 1303 and coupled to a power supply 1306 (e.g., battery or generator) with a power cable 1305. FIG. 13B shows another example implementation where the optical sensor 1304 is coupled to the controller 1302 with a data cable and a power cable 1305 (e.g., where the controller 1302 includes power distribution circuitry and/or a built-in power supply). FIG. 13C shows another example implementation where the optical sensor 1304 is coupled to the controller 1302 with a combined data and power cable 1307 (e.g., a Power over Ethernet (POE) connection, USB connection, or the like).

The controller 102 can be configured to implement a flight path or several flight paths for the aerial drone. For example, the controller 102 can implement a static flight path (e.g., a fully predetermined flight path through a storage facility) or a dynamic flight path (e.g., a flight path that at least partially changes based on one or more inputs (e.g., user inputs, detected position, detected markers/reference points, detected identifiers, etc.)).

Figure 14:
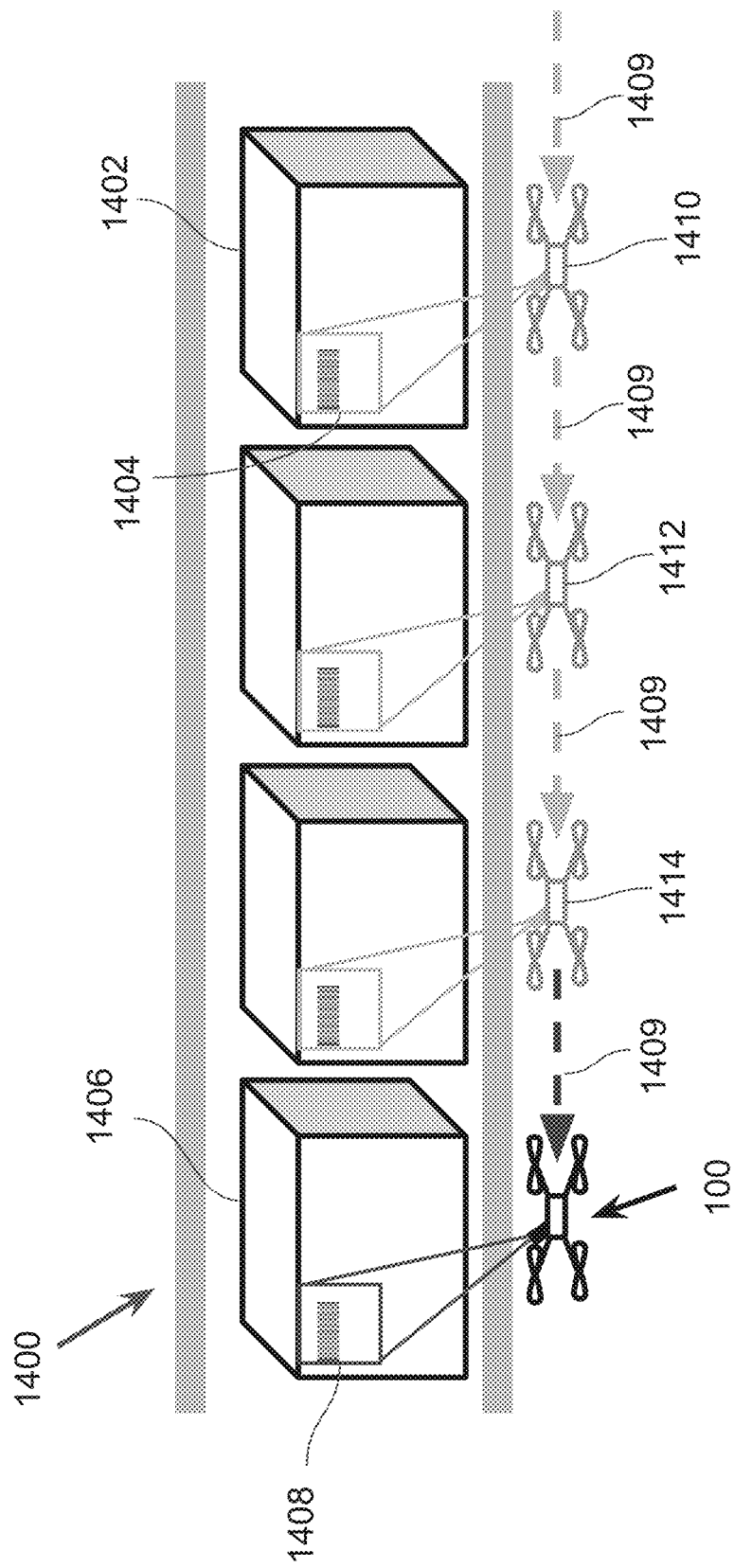
FIG. 14 is an illustration of an aerial drone with an optical sensor configured to scan identifiers based on a flight path of the aerial drone, wherein the flight path comprises a stop-and-go flight path, in accordance with an example embodiment of the present disclosure.

In an implementation shown in FIG. 14, the controller 102 is configured to implement a stop-and-go flight path 1409 for the aerial drone 100. For example, the aerial drone 100 can fly through a storage facility 1400 while scanning identifiers (e.g., identifier 1404, . . . , identifier 1408, etc.) on inventory items (e.g., inventory item 1402, . . . , inventory item 1406, etc.). The controller 102 can be configured to cause the aerial drone 100 to stop at a first position 1410 (e.g., remain at a constant position or at a nearly constant position (e.g., within a restricted range of motion)) and maintain an alignment between the optical sensor 116 and first identifier 1404 for a predetermined time period or until the identifier 1404 is recognized (e.g., until the detected identifier 1404 is successfully correlated with an identifier from a list of stored identifiers and/or until a threshold data set for the inventory item 1402 can be determined/derived from the detected identifier 1404). The controller 102 may be configured to cause the aerial drone 100 to fly to second position 1412, third position 1414, and so on while scanning identifiers for respective inventory items at each of the positions.

Figure 15:
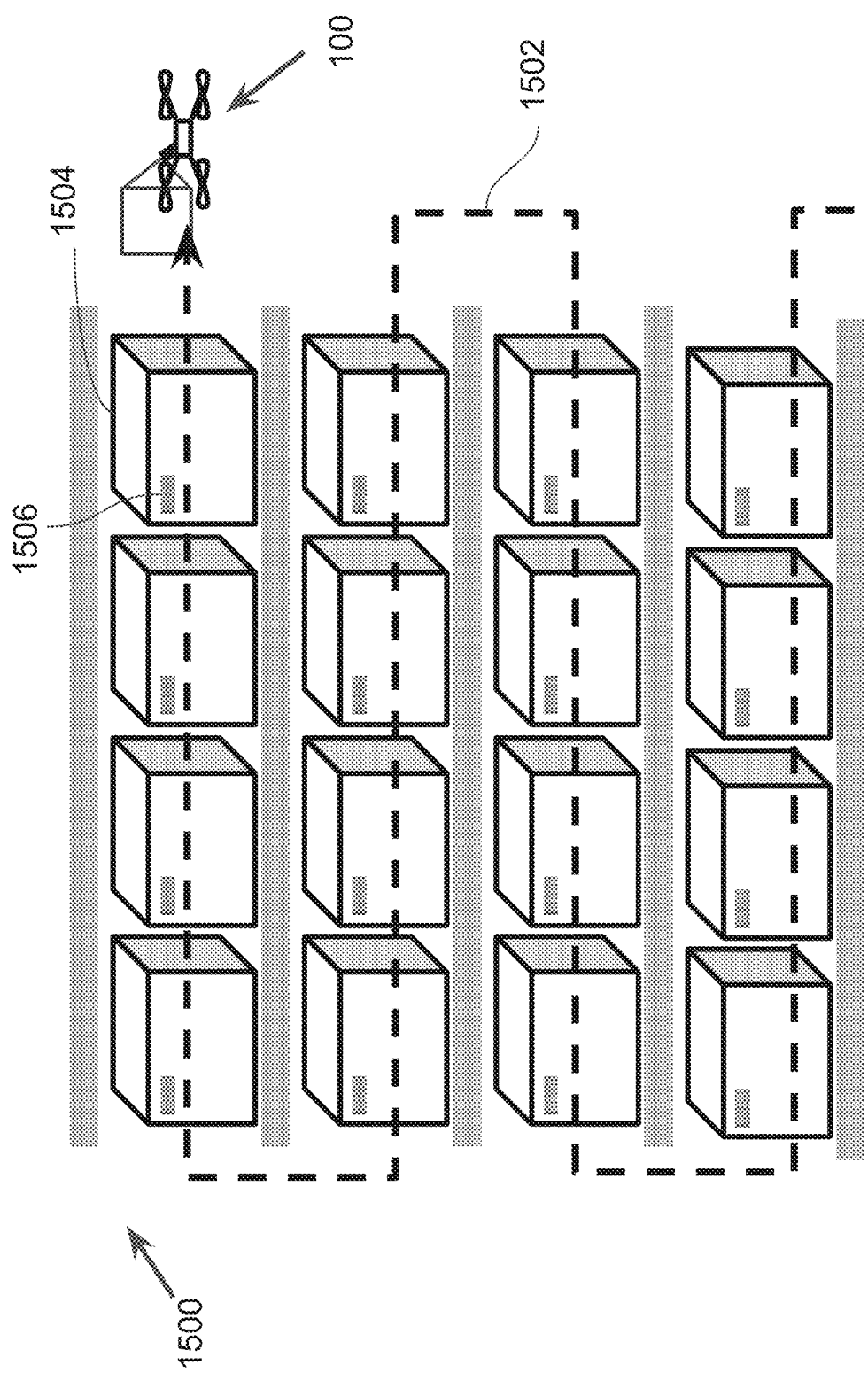
FIG. 15 is an illustration of an aerial drone with an optical sensor configured to scan identifiers based on a flight path of the aerial drone, wherein the flight path causes the aerial drone to scan identifiers of inventory items located on one side of each aisle, in accordance with an example embodiment of the present disclosure.
Figure 16:
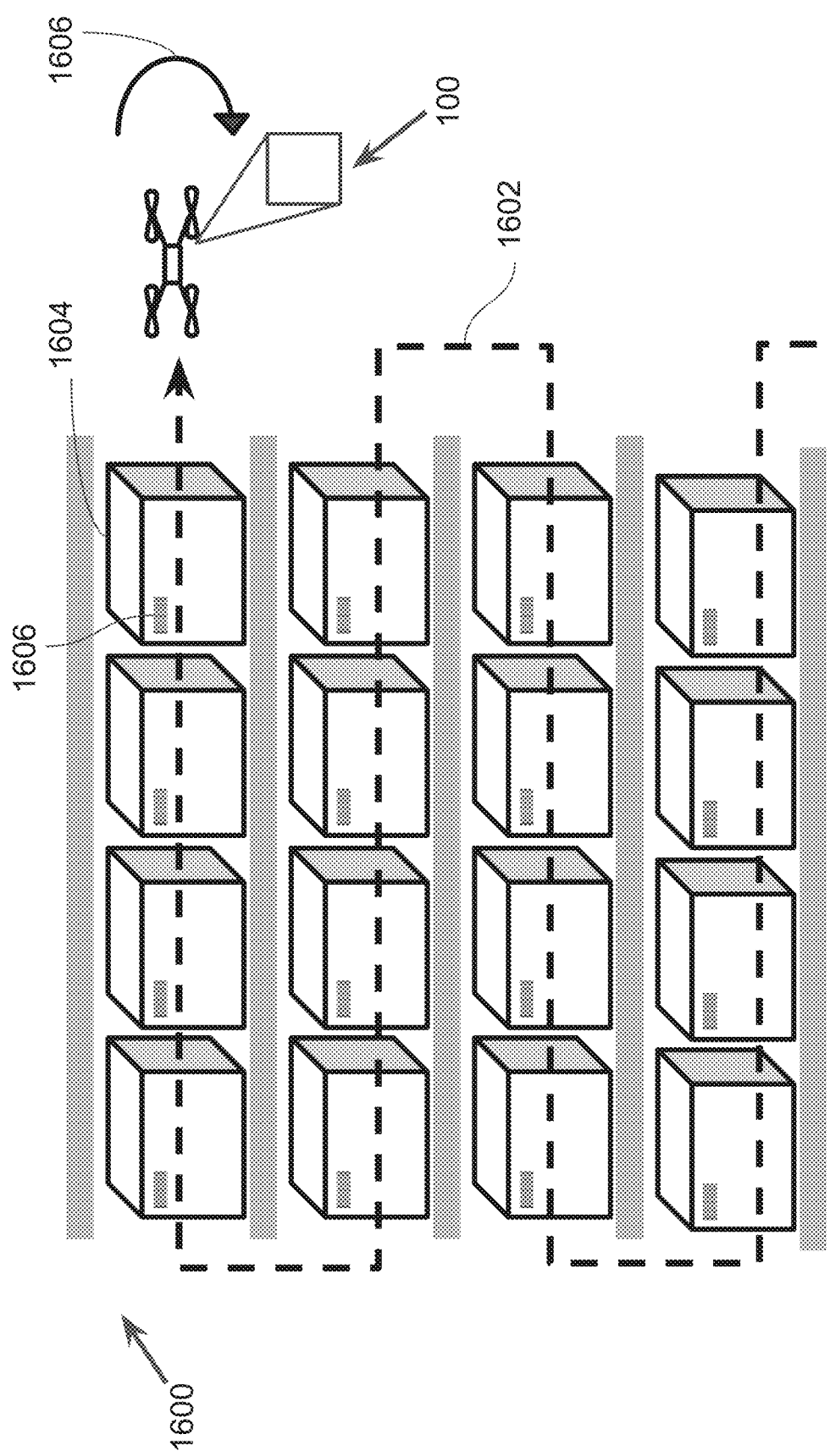
FIG. 16 is an illustration of an aerial drone with an optical sensor configured to scan identifiers based on a flight path of the aerial drone, wherein the flight path causes the aerial drone to scan identifiers of inventory items located on one side of each aisle, where the aerial drone rotates after reaching an endpoint in order to scan identifiers of inventory items located on another (e.g., opposite) side of each aisle, in accordance with an example embodiment of the present disclosure.
Figure 17:
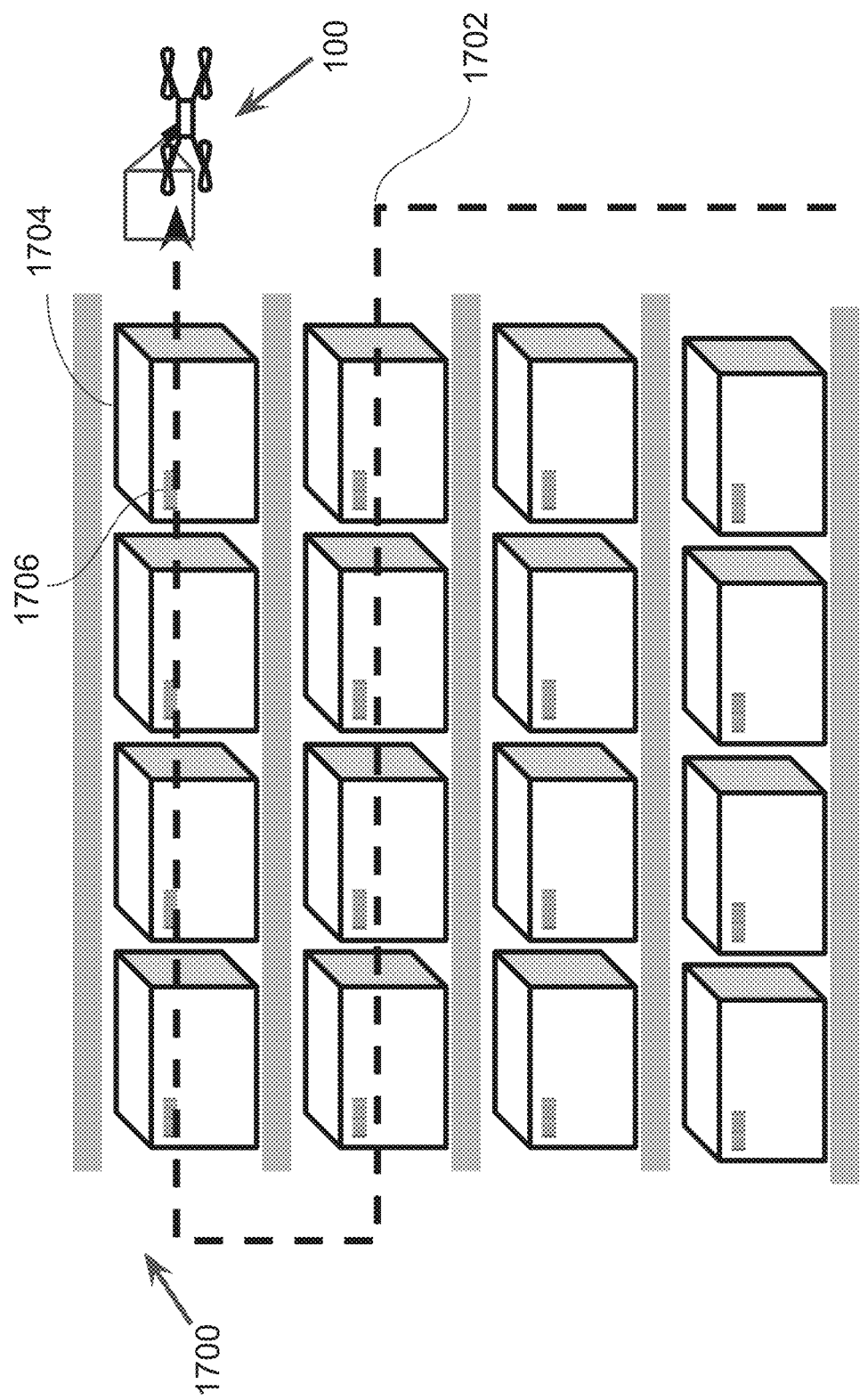
FIG. 17 is an illustration of an aerial drone with an optical sensor configured to scan identifiers based on a flight path of the aerial drone, wherein the flight path causes the aerial drone to scan identifiers of inventory items located in a subset of the aisles, in accordance with an example embodiment of the present disclosure.
Figure 18:
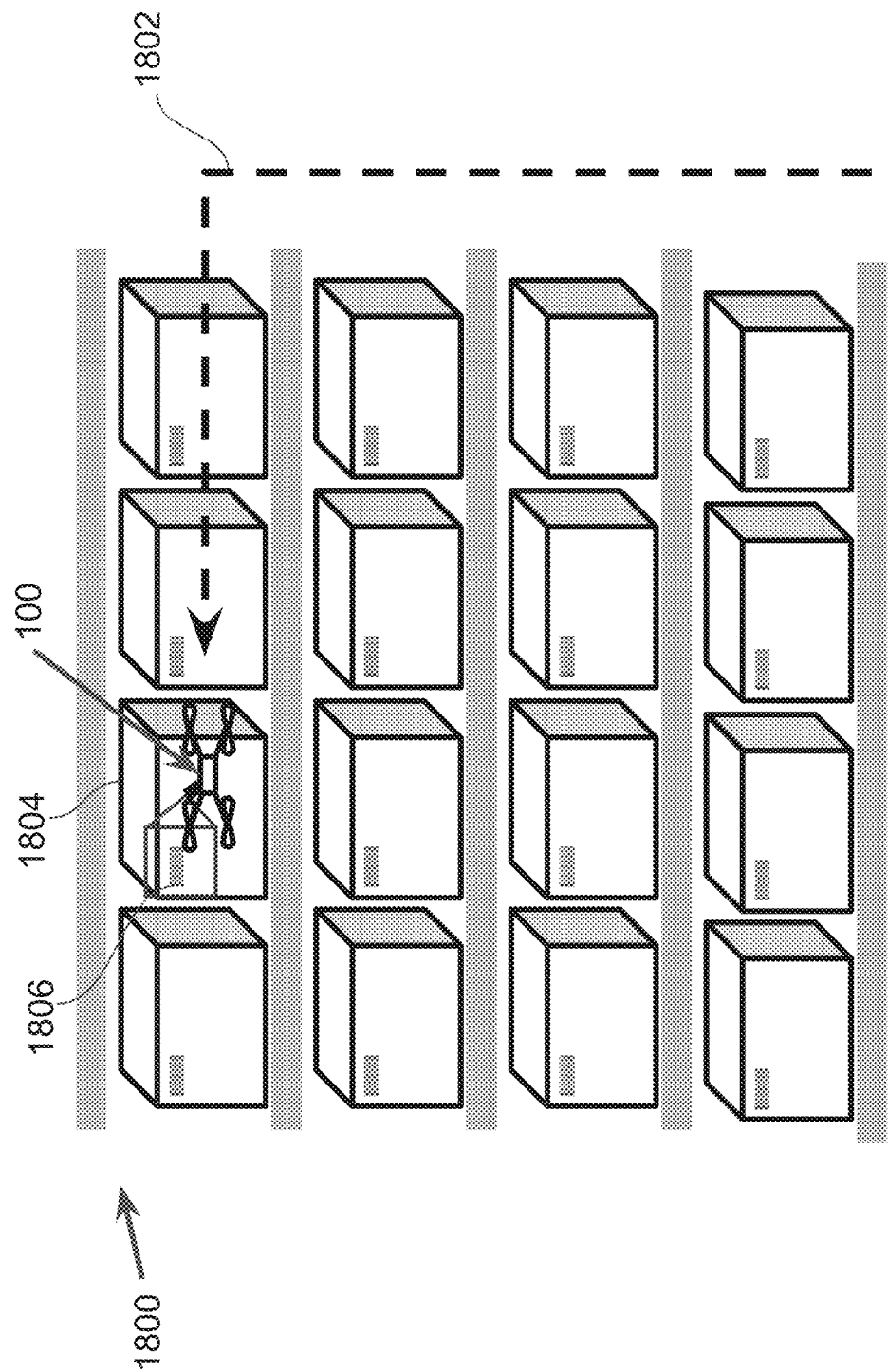
FIG. 18 is an illustration of an aerial drone with an optical sensor configured to scan identifiers based on a flight path of the aerial drone, wherein the flight path causes the aerial drone to scan an identifier of an inventory item at a selected position within a selected aisle, in accordance with an example embodiment of the present disclosure.
Figure 19:
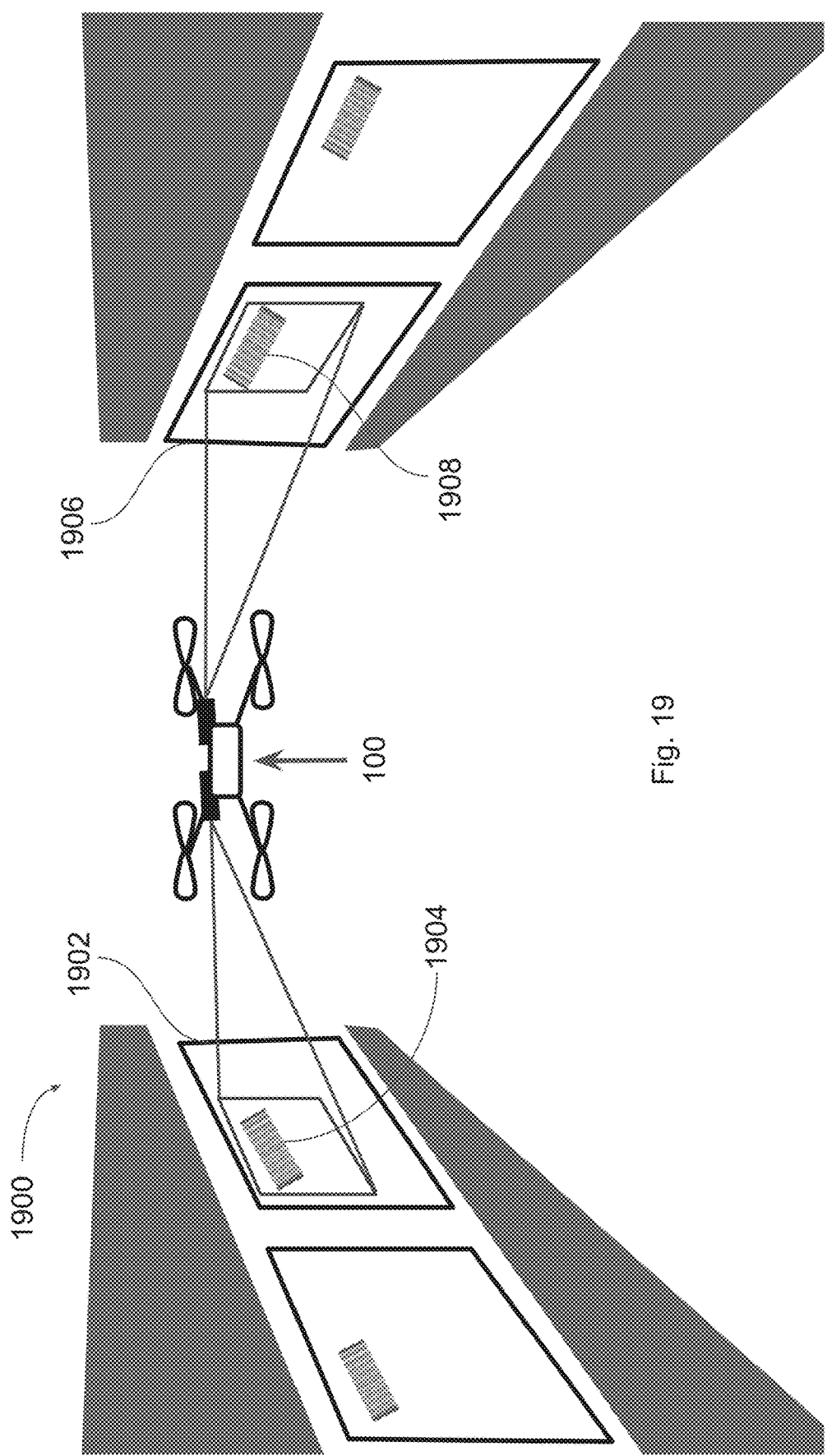
FIG. 19 is an illustration of an aerial drone with an optical sensor and at least a second (oppositely facing) optical sensor configured to simultaneously or substantially simultaneously scan identifiers located on opposing sides of an aisle based on a flight path of the aerial drone, in accordance with an example embodiment of the present disclosure.

There are several manners by which the aerial drone 100 can be configured to scan identifiers for inventory items located on both sides (e.g., on opposing, inward facing sides) of an aisle. For example, in FIGS. 15 and 16, the controller may be configured to cause the aerial drone to follow a zig-zag flight path (e.g., flight path 1502/1602) through a storage facility (e.g., storage facility 1500/1600) such that the optical sensor 100 detects identifiers 1506 of inventory items 1504 located one side of each aisle of a plurality of aisles prior to reaching an end of the plurality of aisles. Then, as shown in FIG. 16, the controller 102 can be configured to cause the aerial drone 100 to turn around (e.g., a rotation 1606 of about 180 degrees) and perform the same flight path 1602 in an opposite direction in order to scan identifiers 1606 of the inventory items 1604 located on the other side of each aisle of the plurality of aisles. In another example implementation shown in FIG. 17, the controller 102 is configured to cause the aerial drone 100 to follow a flight path 1702 that causes the aerial drone 100 scan identifiers 1706 of inventory items 1704 located in a subset of the aisles of the storage facility 1700. In another implementation shown in FIG. 18, the controller 102 is configured to cause the aerial drone 100 to follow a flight path 1802 that causes the aerial drone 100 to travel to a particular (e.g., user selected or program selected) inventory item 1804 and scan an identifier 1806 on the selected inventory item 1804 within a storage facility 1800. For example, the aerial drone 100 may be dispatched to a selected position within a selected aisle (e.g., using column and row selection, or the like). In another example implementation shown in FIG. 19, the aerial drone 100 includes at least two optical sensors 116 (e.g., a first optical sensor and a second optical sensor, with the second optical sensor oriented such that it faces an opposite direction relative to the first optical sensor; in other words, at least two optical sensors 116 that generally face away from one another). The controller 102 can be configured to implement a flight path down an aisle of a storage facility 1900 that causes the first optical sensor and the second optical sensor to align with and detect identifiers (e.g., identifiers 1904 and 1908) of inventory items (e.g., inventory items 1902 and 1906) located on opposing sides of the aisle prior to reaching an end of the aisle. The controller 102 may be configured to detect identifiers with the at least two optical sensors 116 simultaneously, at least partially in parallel, or immediately after one another.

The warehouse inventory management system can employ one or more techniques to identify reference points (e.g., endpoints) of aisles or other structures within a storage facility. In an example implementation shown in FIG. 20, the aerial drone 100 is in communication with a user device 2000 (e.g., a mobile device, notebook computer, desktop computer, etc.). For example, the controller 102 can receive communications from the user device 2000 via the communications interface 108. In an embodiment, the user device 2000 is configured to receive a user input 2002 including a distance for the aerial drone to travel. The user device 2000 may further receive a user selection 2004 to initiate drone operation. In response, the flight path information is communicated to the controller 102, and the controller 102 can be configured to cause the aerial drone 100 to follow a flight path 2006 that extends a distance 2008 that is based on (e.g., equal to) the user input 2002. For example, the aerial drone 100 may travel the distance 2008 before stopping or turning around within a storage facility.

Figure 21B:
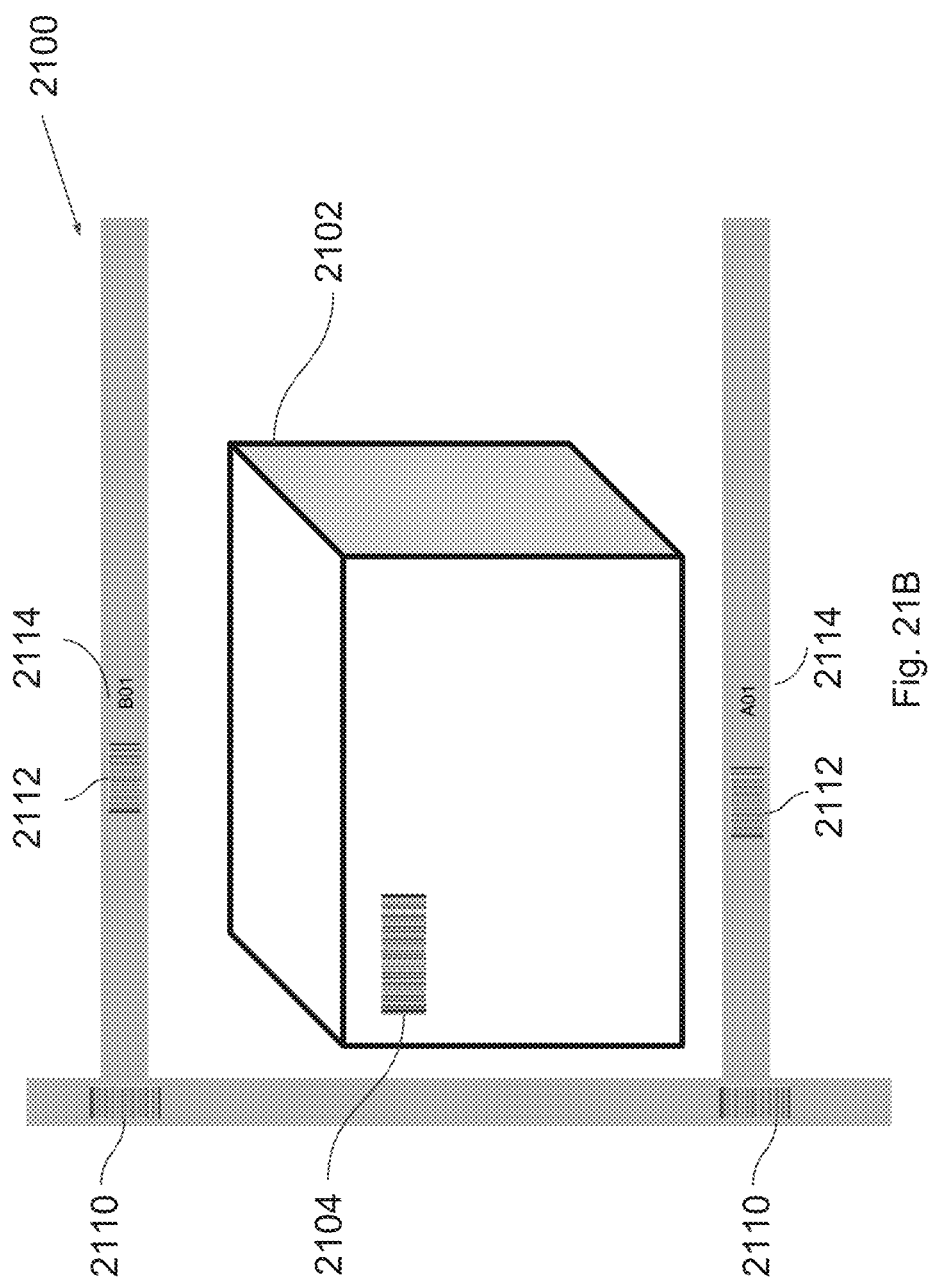
FIG. 21B is an illustration of a system including an aerial drone with an optical sensor configured to scan identifiers based on a flight path of the aerial drone, wherein the aerial drone is configured to detect a portion (e.g., an end) of an aisle before stopping or changing direction, wherein the portion of the aisle is detected based upon one or more identifiers disposed upon or near the portion of the aisle, such as using image processing, computer vision, and/or machine learning techniques, in accordance with an example embodiment of the present disclosure.

In another implementation shown in FIG. 21A, the controller 102 is configured to detect a recognizable portion 2108 (e.g., an end) of an aisle before stopping or changing direction. For example, the controller 102 can be configured to employ computer vision to recognize image features that correspond to a reference point (e.g., endpoint) of a shelf or other structure within a storage facility 2100, or use non-feature based approaches in image processing, computer vision, and/or machine learning for the same task. In some embodiments, the controller 102 relies on a camera 118 in addition to the optical sensor 116 to detect the recognizable portion of the aisle, and the optical sensor 116 is used to detect identifiers 2104 on inventory items 2102. In other embodiments, the optical sensor 116 (e.g., a camera) is used to detect the identifiers 2104 as well as the recognizable portions 2108. The aerial drone 100 may be configured to follow a flight path 2106 until the recognizable portion 2108 is detected, and then the controller 102 can cause the aerial drone 100 to stop, turn around, or follow a new flight path or updated version of the flight path 2106. In some implementations, the reference points are tagged with identifiers that can be detected by the optical sensor 116 and/or the camera 118. For example, as shown in FIG. 21B, the aisles can have identifiers 2110 at the ends of the aisles (or at other reference points within the aisles). The aisles can also have identifiers 2112 located at a vertical reference points 2114 (e.g., to indicate different shelves/pallets) within the aisles. In this regard, the controller 102 can be configured to cause the aerial drone 100 to travel to selected shelf locations within an aisle and/or determine when the aerial drone 100 has scanned a top shelf of the aisle (e.g., finished scanning all identifiers 2104 of inventory items 2102 within the aisle).

Figure 22C:
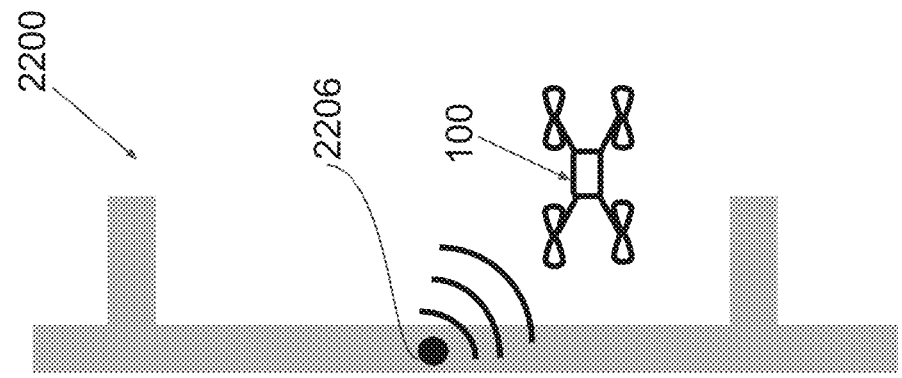
FIG. 22C is an illustration of a system including an aerial drone with an optical sensor configured to scan identifiers based on a flight path of the aerial drone, wherein the aerial drone is configured to detect a marker located in proximity to (e.g., at or near) a portion (e.g., an end) of an aisle before stopping or changing direction, wherein the marker includes a wireless transmitter or transceiver, in accordance with an example embodiment of the present disclosure.
Figure 22B:
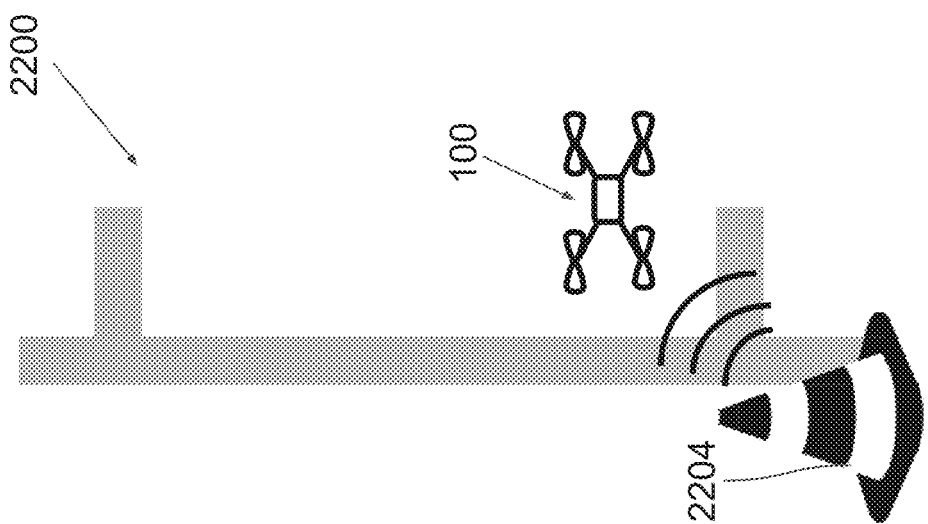
FIG. 22B is an illustration of a system including an aerial drone with an optical sensor configured to scan identifiers based on a flight path of the aerial drone, wherein the aerial drone is configured to detect a marker located in proximity to (e.g., at or near) a portion (e.g., an end) of an aisle before stopping or changing direction, wherein the marker includes a recognizable object (e.g., a pylon, flag, colored/patterned fiducial marker, indicator light, etc.), in accordance with an example embodiment of the present disclosure. Such object may be identified visually, or by transmitting wireless signals to the drone.
Figure 22A:
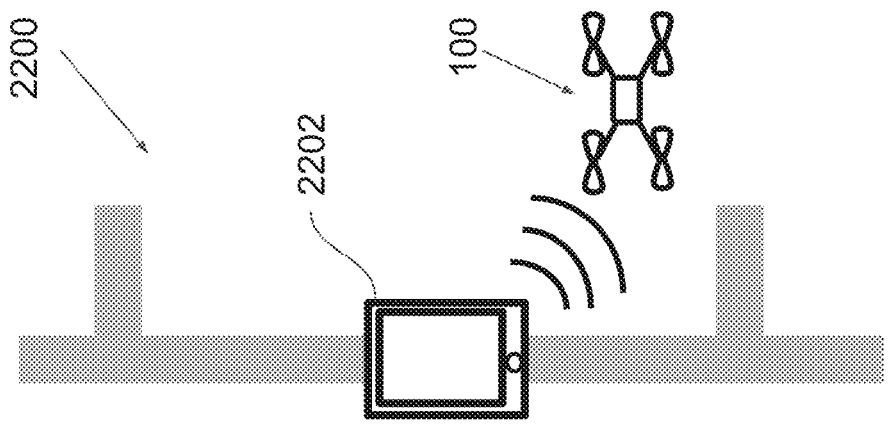
FIG. 22A is an illustration of a system including an aerial drone with an optical sensor configured to scan identifiers based on a flight path of the aerial drone, wherein the aerial drone is configured to detect a marker located in proximity to (e.g., at or near) a portion (e.g., an end) of an aisle before stopping or changing direction, wherein the marker includes a mobile device (e.g., a smartphone, a tablet, etc.), in accordance with an example embodiment of the present disclosure.

In some implementations (e.g., as shown in FIGS. 22A through 22C), the warehouse inventory management system can employ markers to indicate respective endpoints of aisles and/or other reference points within a storage facility 2200. For example, a marker can comprise a mobile device 2202 (e.g., a smartphone, a tablet, etc.) configured to display a visual indicator or transmit a wireless signal that is detectable by the aerial drone 100 (e.g., using the optical sensor 116 or another sensor, wireless transceiver, or the like). In another example implementation, a marker can comprise a recognizable object 2204 (e.g., a pylon, flag, colored/patterned fiducial marker, indicator light, etc.). In another example implementation, a marker can comprise a wireless transmitter or transceiver 2206 (e.g., RFID tag, Bluetooth beacon, WiFi or ZigBee transmitter/transceiver, ultra-wideband (UWB) transmitter/transceiver, radio frequency (RF) transmitter/transceiver, or the like). Any number or combination of markers can be implemented throughout the system.

Figure 23:
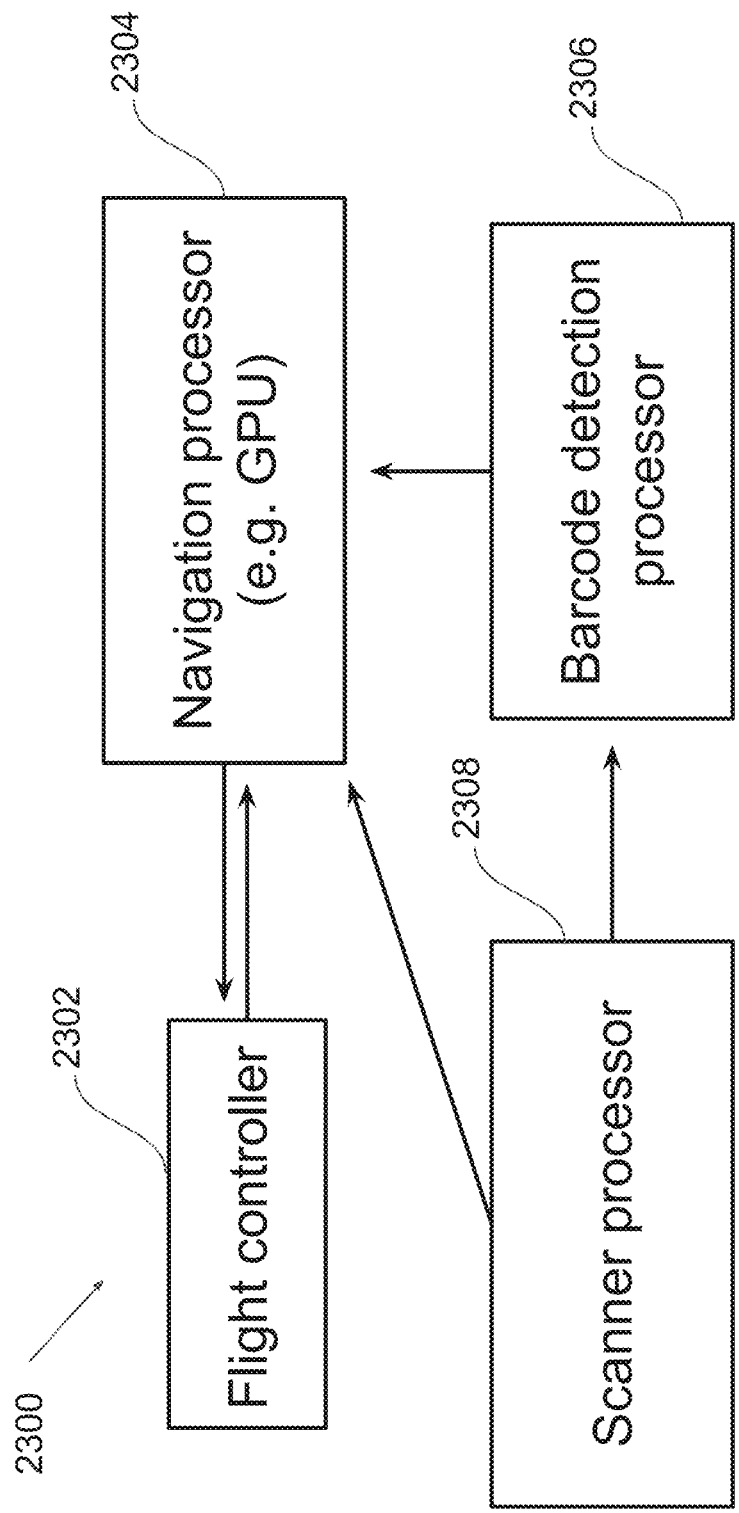
FIG. 23 is a block diagram illustrating control/processor blocks for an aerial drone, including navigation, scanning, and/or identifier detection processor(s), in accordance with an example embodiment of the present disclosure.

FIG. 23 is a block diagram illustrating a control system 2300 configuration for the aerial drone 100, in accordance with an embodiment of the present disclosure. For example, the control system 2300 can include a flight controller 2302 (e.g., controller 110 and/or controller 102), a navigation processor 2304 (e.g., controller 102 and/or graphics processor 124), barcode detection processor 2306 (e.g., controller 102 and/or graphics processor 124), and scanner processor 2308 (e.g., controller 102 and/or graphics processor 124). The flight controller 2302 is configured to handle low level commands (e.g., control signal) for the motors 112. The navigation processor 2304, barcode detection processor 2306, and/or scanner processor 2308 may be implemented by the controller 102 and/or the graphics processor 124 to provide processing for the indoor navigation system 122, optical sensor(s) 116, camera 118, and/or additional sensor(s) 120 for identifier recognition, OCR and other computer vision/machine learning, and/or localization, navigation, and stabilization processes for navigating the aerial drone within a storage facility.

In some embodiments, the aerial drone 100 has an indoor positioning system 122 communicatively coupled to the controller 102. For example, the indoor positioning system 122 can include an optical flow camera-based positioning system, a triangulation based (e.g., laser or RF) positioning system, a light detection and ranging (LIDAR) or camera-based a simultaneous localization and mapping (SLAM) positioning system, a laser or ultrasonic rangefinder based positioning system, inertial tracking system, or the like, and any combination thereof. The controller 102 can be configured to determine a position of the aerial drone 100 based on one or more signals from the indoor positioning system 122. The controller 102 may be further configured to associate the determined position with a detected identifier. For example, the controller 102 can be configured to store respective positions for the detected identifiers. The controller 102 can also be configured to determine the flight path for the aerial drone 100 based upon the determined position of the aerial drone 100 and/or a determined position of the aerial drone 100 relative to one or more markers or other reference points.

In an example implementation shown in FIG. 24, the indoor positioning system 122 can include at least one receiver or transceiver configured to detect signals from a plurality of transmitters 2402 (e.g., RF transmitters, Bluetooth beacons, WiFi transmitters, ZigBee transmitters, UWB transmitters, LEDs or other light emitters, or other active transmitters) within a storage facility. The controller 102 can be configured to determine a position of the aerial drone 100 by triangulating signals received from the plurality of transmitters 2402. In some embodiments, the controller 102 utilizes a graphics processor 124 or another auxiliary processor to perform the triangulation.

Figure 25A:
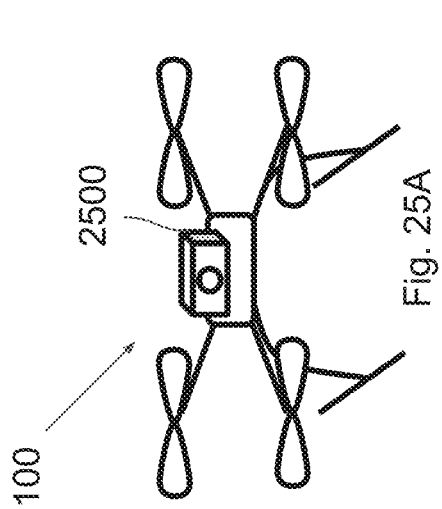
FIG. 25A is an illustration of an aerial drone with an optical sensor configured to scan identifiers based on a flight path of the aerial drone, wherein a position of the aerial drone is detected based on a monocular camera-based positioning system, such as an IDS UEye global shutter camera or any other such monocular camera, in accordance with an example embodiment of the present disclosure.
Figure 25B:
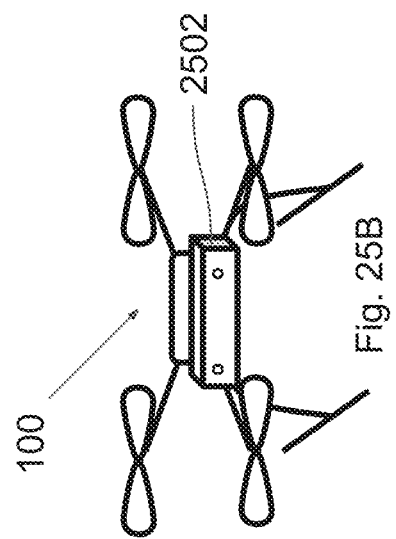
FIG. 25B is an illustration of an aerial drone with an optical sensor configured to scan identifiers based on a flight path of the aerial drone, wherein a position of the aerial drone is detected based on a stereoscopic camera-based positioning system, such as an Intel Realsense, Microsoft Kinect, DJI Guidance, or any other such stereoscopic camera system, in accordance with an example embodiment of the present disclosure.
Figure 25C:
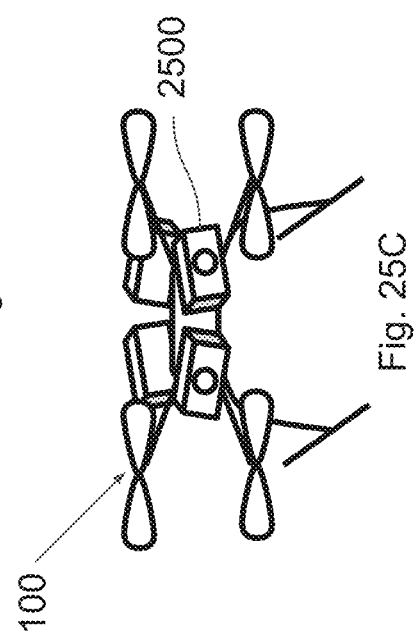
FIG. 25C is an illustration of an aerial drone with an optical sensor configured to scan identifiers based on a flight path of the aerial drone, wherein a position of the aerial drone is detected based on a multiple monocular or stereoscopic camera-based positioning system, in accordance with an example embodiment of the present disclosure.
Figure 25D:
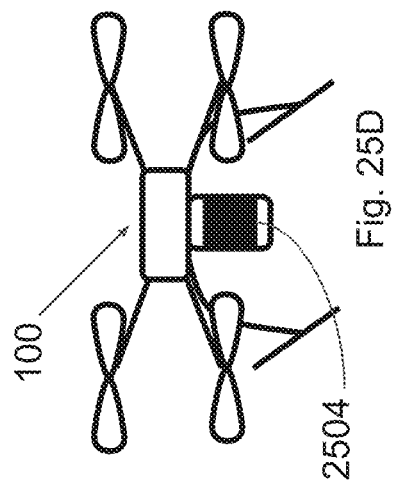
FIG. 25D is an illustration of an aerial drone with an optical sensor configured to scan identifiers based on a flight path of the aerial drone, wherein a position of the aerial drone is detected based on a light detection and ranging (LIDAR) positioning system, such as the Velodyne PUCK, or any other such LIDAR system), in accordance with an example embodiment of the present disclosure.

In example implementations shown in FIGS. 25A through 25D, the indoor positioning system 122 can include cameras and/or light sensors to determine a position of the aerial drone 100 based on SLAM, visual-inertial, and/or LIDAR fused algorithms that are performed by the controller 102 and/or graphics processor 124. For example, FIG. 25A shows an embodiment of the aerial drone 100 where the indoor positioning system 122 includes a monocular camera 2500 for use with a SLAM, visual-inertial, and/or LIDAR fused positioning system; FIG. 25B shows an embodiment of the aerial drone 100 where the indoor positioning system 122 includes a stereoscopic camera 2502 for use with a SLAM, visual-inertial, and/or LIDAR fused positioning system; FIG. 25C shows an embodiment of the aerial drone 100 where the indoor positioning system 122 includes a plurality of monocular cameras 2500 for use with a SLAM, visual-inertial, and/or LIDAR fused positioning system; and FIG. 25D shows an embodiment of the aerial drone 100 where the indoor positioning system 122 includes a LIDAR device (e.g., Velodyne PUCK, or the like). In some implementations, the indoor positioning system 122 may additionally or alternatively include, but is not limited to, distance sensors (e.g., laser or ultraviolet differential or depth sensors, sonar or radar distance sensors, etc.), inertial sensors (e.g., accelerometers, gyroscopes, etc.), or the like.

The controller 102 and associated circuitry/components (e.g., a graphics processor 124 or the like) can be configured to perform an image processing algorithm on an image of an identifier and/or text, symbols, drawings, or pictures associated with the identifier to implement machine learning or computer vision functionalities. For example, the controller 102 can be configured to detect the identifier and capture an image of an identifier with the optical sensor 116 and/or a camera 118 on the aerial drone. The controller 102 can then perform an image processing algorithm on the image to detect at least one recognizable feature of the identifier and/or text, symbols, drawings, or pictures associated with the identifier (e.g., using a processor 104 of the controller 102 and/or a graphics processor 124 communicatively coupled to the controller, and/or another auxiliary processor having a higher speed processor and/or more processing cores than the controller 102).

In order to detect identifiers (e.g., barcodes, QR codes, text, symbols, images, etc.), the aerial drone 100 must be able to align the optical sensor 116 with the identifier. In some embodiments, the aerial drone 100 can employ a wide field of view camera (e.g., camera 118) to collect image data, determine positioning of at least one identifier based upon the image data, and utilize the positioning information to align the optical sensor 116 with the identifier. For example, the controller 102 can be configured to adjust the drone's flight path or trajectory based upon the positioning information derived from the image data. The controller 102 may employ various machine learning approaches, as discussed above. For example, the controller 102 can employ Haar Cascade algorithms, Neural Network algorithms, You Only Look Once algorithms, or the like. The controller 102 can also employ various computer vision approaches, such as, but not limited to, color segmentation algorithms, line segmentation algorithms, and so forth.

Figure 26A:
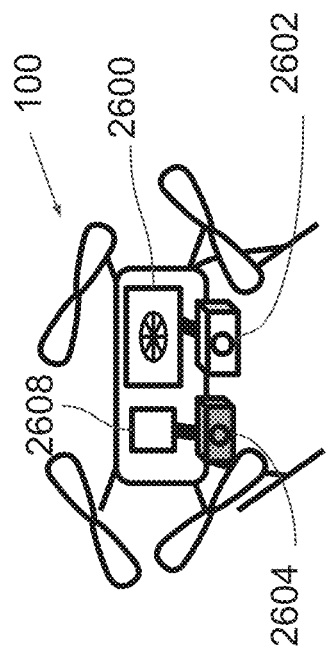
FIG. 26A is an illustration of an aerial drone with an optical sensor and a camera having a wider field of view than the optical sensor, wherein the aerial drone is configured to detect an identifier with the optical sensor, capture an image of the identifier with the camera, and perform an image processing and/or machine learning algorithm on the captured image of the identifier, wherein the optical sensor and the camera are communicatively coupled to a graphics processor, in accordance with an example embodiment of the present disclosure.
Figure 26B:
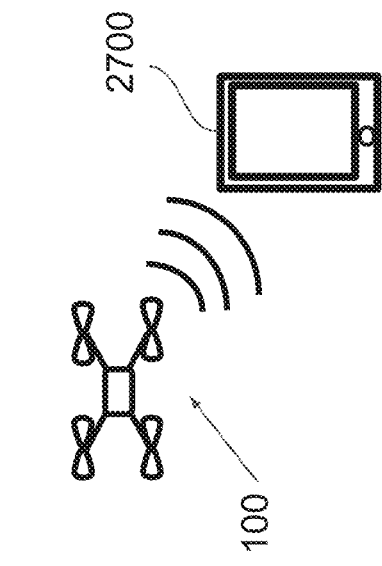
FIG. 26B is an illustration of an aerial drone with an optical sensor and a camera having a wider field of view than the optical sensor, wherein the aerial drone is configured to detect an identifier with the optical sensor, capture an image of the identifier with the camera, and perform an image processing and/or machine learning algorithm on the captured image of the identifier, wherein the camera is communicatively coupled to a graphics processor and the optical sensor is communicatively coupled to a controller, in accordance with an example embodiment of the present disclosure.

In the embodiments shown in FIGS. 26A and 26B, the aerial drone 100 includes a wide field of view camera 2602 (e.g., camera 118) in addition to an optical sensor 2604 (e.g., optical sensor 116). The aerial drone 100 can also include a dedicated graphics processor 2600 (e.g., graphics processor 124) that processes image data collected by the camera 2602. In the embodiment shown in FIG. 26A, the graphics processor 2600 is configured to process image data collected by the camera 2602 in addition to scan data collected by the optical sensor 2604. In the embodiment shown in FIG. 26B, the graphics processor 2600 is configured to process image data collected by the camera 2602 and another processor 2608 (e.g., controller 102) is configured to process scan data collected by the optical sensor 2604.

Figure 27:
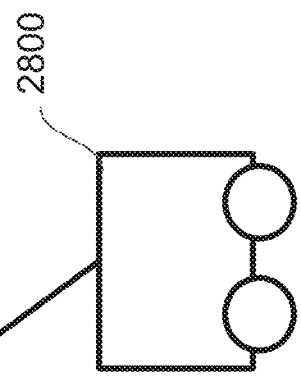
FIG. 27 is an illustration of an aerial drone with an optical sensor configured to scan identifiers based on a flight path of the aerial drone, wherein the aerial drone is in communication with a device, the device configured to receive and process information associated with the identifiers detected by the aerial drone, in accordance with an example embodiment of the present disclosure.
Figure 28:
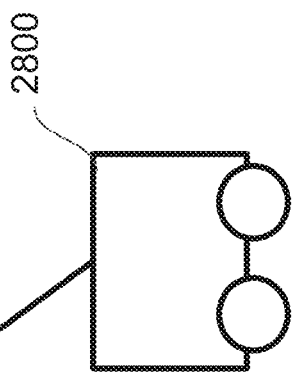
FIG. 28 is an illustration of an aerial drone with an optical sensor configured to scan identifiers based on a flight path of the aerial drone, wherein the aerial drone is tethered to a portable device, such as a 4-wheel ground robot with onboard graphics processing units, the portable device configured to receive and process information associated with the identifiers detected by the aerial drone, in accordance with an example embodiment of the present disclosure.

FIGS. 27 and 28 show embodiments of the aerial drone 100, where at least a portion of the image data and/or scan data processing is performed by another device that is communicatively coupled to the aerial drone 100. For example, as shown in FIG. 27, the aerial drone 100 can be configured to transmit image data collected by the camera 118 to another device 2700 (e.g., mobile device, notebook computer, desktop computer, server, WMS, etc.). The device 2700 can be configured to perform one or more image processing algorithms on the image data and can be further configured to transmit information (e.g., positioning information, control instructions, etc.) to the aerial drone 100 based upon the image data. In another embodiment shown in FIG. 28, the aerial drone 100 can be tethered (e.g., via a communicative coupling) to a portable device 2800 (e.g., a terrestrial robot that follows the aerial drone 100 and/or a vehicle/cart pulled by the aerial drone 100), where the portable device 2800 can be configured to perform one or more image processing algorithms on the image data and can be further configured to transmit information (e.g., positioning information, control instructions, etc.) to the aerial drone 100 based upon the image data. In some embodiments, the portable device 2800 can also be configured to supply power to the aerial drone 100.

Referring now to FIGS. 29A through 29C, the aerial drone can be configured to communicate with a warehouse management system (WMS) 2900 that stores inventory data for the storage facility. In embodiments, the WMS 2900 may include, but is not limited to, an onsite computer/server, a network of onsite computers/servers, a remote computer/server, a network of remote computers/servers, a cloud computing network, a network accessible by one or more mobile devices, or any combination of the foregoing. As shown in FIG. 29A, the WMS 2900 can include at least one processor 2902, a memory 2904, and a communications interface 2906 (e.g., for communicating with the aerial drone 100, user devices, and so forth). Examples of a processor, memory, and communications interface are described above (e.g., with reference to processor 104, memory 106, and communications interface 108). The WMS 2900 can also include a user interface 2908 (e.g., a display, touch panel, I/O device(s), etc.) for presenting information and receiving user inputs/selections. In some embodiments, the WMS 2900 is configured to present information via the user interface 2908 (e.g., by displaying a graphical user interface) and/or the WMS 2900 can provide access to a graphical user interface that is generated by the WMS 2900 (e.g., the WMS 2900 can be accessed via a browser or app running on a user device (e.g., mobile device, computer, etc.)).

Figure 30B:
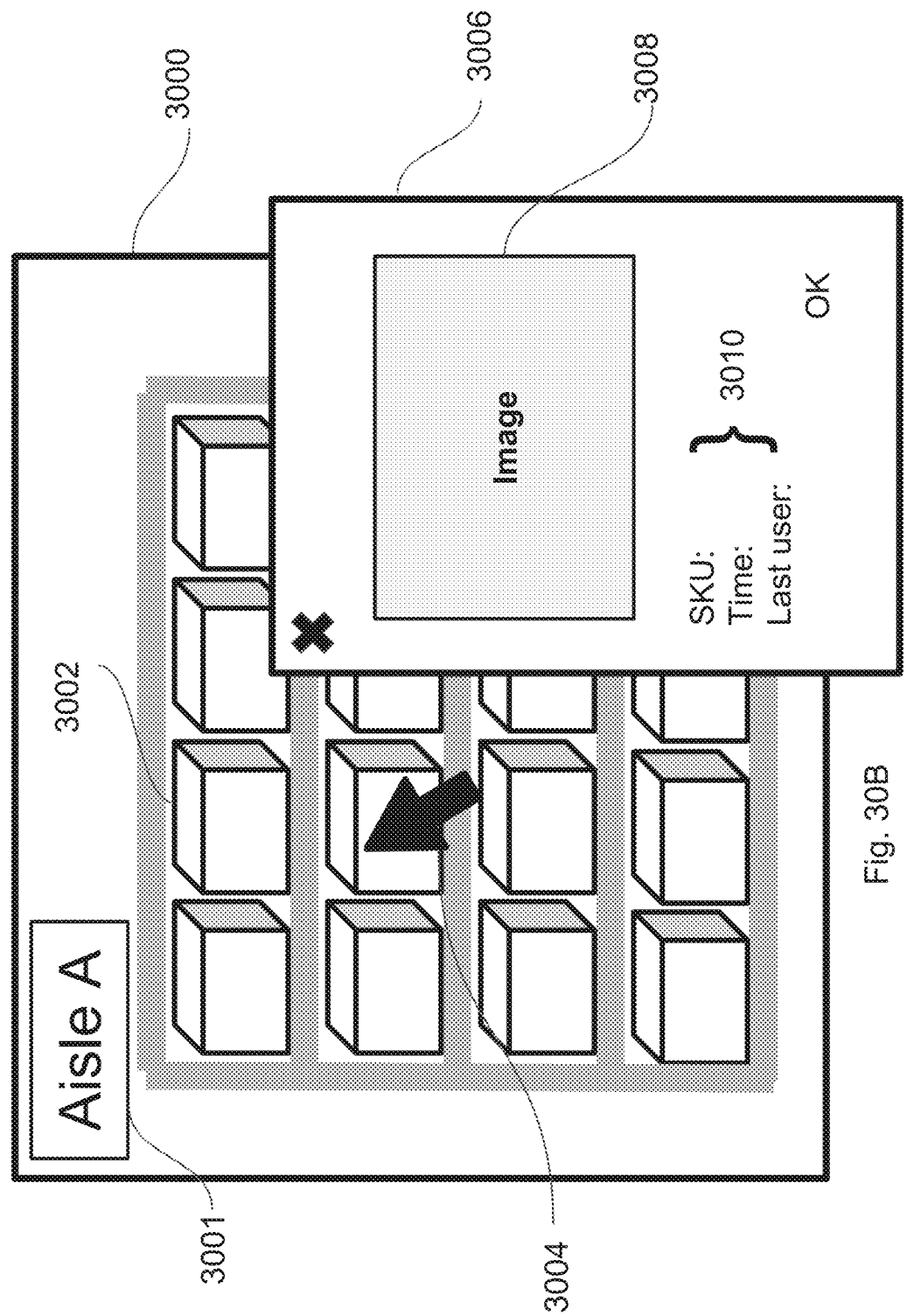
FIG. 30B is a graphical user interface generated by a WMS based on information associated with identifiers of inventory items detected by an aerial drone, such as the aerial drone in any of the embodiments illustrated by FIGS. 1A through 28, wherein the graphical user interface includes a mapping of the inventory items, and in response to receiving a selection of an inventory item of the mapped inventory items, the graphical user interface displays information corresponding to the selected inventory item based on the information received by the WMS from the aerial drone, in accordance with an example embodiment of the present disclosure.

The controller 102 may be configured to transmit information associated with the detected identifiers to the WMS 2900. The WMS 2900 can have an onsite user interface (e.g., user interface 2908) and/or can be configured to transmit information for display via a user interface of a connected (e.g., wired or wirelessly connected) user device (e.g., a computer, mobile device, or the like). FIG. 29C shows an example of a table that can be displayed via the graphical user interface generated by the WMS 2900 and/or exported to an Excel file or the like. The table shown in FIG. 29C includes values (e.g., A1, A2, A3, B1, C, . . . ) populated by the WMS 2900 based on the identifiers of inventory items and/or other information (e.g., time, date, location, sensor info (e.g., altitude, temperature, humidity, etc.), and so forth) detected by the aerial drone 100. As shown in FIGS. 30A and 30B, in some embodiments, the graphical user interface generated by the WMS 2900 can include a mapping 3000 of a plurality of inventory items 3002. For example, the mapping 3000 can correspond to an aisle selection 3001 input by the user. The graphical user interface can be configured to receive user inputs (e.g., data entries, selections, etc.) via an I/O device (e.g., keyboard, mouse, touch panel, microphone (e.g., for voice commands), and the like). In response to receiving a selection of an inventory item 3002 (e.g., via cursor 3004, touch input, verbal command, text input, or the like), the WMS 2900 may be configured to cause the graphical user interface to display information corresponding to the selected inventory item 3002 based on information received from the aerial drone 100. For example, as shown in FIG. 30B, the graphical user interface may display a window 3006 adjacent to or at least partially on top of the mapping 3000. The graphical user interface can be configured to display (e.g., in the window 3006) an image 3008 of the inventory item 3002 and/or an image 3008 of the identifier on the inventory item 3002 that was detected by the aerial drone 100. The graphical user interface can also be configured to display product information 3010, such as, but not limited to, a reference value (e.g., SKU number, serial number, or other product label), time and/or date, last user information, location, sensor info (e.g., altitude, temperature, humidity, etc.), or any combination thereof.

In some embodiments, the wireless connection utilized by the warehouse inventory management system may be configured to transmit data to and receive data from the drone 100, such as image, video, depth measurement, distance measurement, position and orientation, flight time, command, three-dimensional reconstruction, processed label data, and/or other data. In one non-limiting configuration, the data may be transmitted through the wireless connection to an external processor, including a local processor such as a drone ground station, a laptop, a personal computer, a smartphone, a tablet, or other such processors. In another non-limiting configuration, the data may be transmitted through the wireless connection to a cloud for processing, such as cloud processing platforms provided by Amazon Web Services, Google Cloud, Microsoft Azure, IBM SmartCloud, and other such cloud computing platforms. Another non-limiting configuration may be that sensor data collection, processing of label data, 3D reconstruction could all be completed on the processor on the drone, of which the output is sent to an external processor via a wireless connection. The wireless connection utilized by the warehouse inventory management system may be or may include an internet connection configured over a Wi-Fi network, a cellular network, a satellite internet network, or other internet service network. Alternatively, the wireless connection may be or include another wireless connection protocol. Furthermore, the wireless connection may be configured as a private local area wireless network for communication with the drone and/or other devices.

In some embodiments, the external processor may contain software for the user control interface system. The user control interface system may include but is not limited to a three-dimensional model generated from the sensor data sent by the drone, a GUI connected to and/or a part of the data storage system, a map of the warehouse and located item(s), and commands for future drone actions. The three-dimensional model may be created through photogrammetry, laser scan point cloud, stereo camera point cloud, or other appropriate techniques. In one non-limiting example, the user interface control system software runs on a processor external to the drone (a local processor or processors on the cloud). This user interface control system can be separate from and interact with an inventory management software, or alternatively it could be bundled together to be a part of the inventory management software. The GUI connected to and/or a part of the data storage system may be connected to and/or a part of inventory management software and may connect processed label data with specific items in the software. In one non-limiting example, the GUI connected to and/or a part of the data storage system may comprise information such as item number, bar code number, item name, order number, shipping status, storage status, location in warehouse, timestamp, bar code image, package image, item image, real-time video stream, or other appropriate information. Moreover, the user control interface system may also contain a map of the interior of the warehouse, comprising of a two- or three-dimensional model of the interior layout of the warehouse. The map may contain information such as aisles, rows, pallets, packages, items, and other information.

Furthermore, application software and/or control algorithms may be loaded and/or stored on the external processor which may be used to control the drone 100 over the wireless connection. Additionally or alternatively, the application software and control algorithms may be stored and located on the internet and accessible by the user control interface system and the drone 100. Moreover, the user control interface system may have the ability to access and execute other software over the wireless connection. In some embodiments the software may be configurable and modular, and a user may be able to configure the software to direct the drone to perform a task or a plurality of tasks as needed. For example, the user control interface system may contain commands for the drone 100, possibly given by a user through the user control interface system or automated by programming, which may be sent over the wireless network to be executed by the drone. These commands may be represented in the form of clickable buttons, key presses, touchscreen key presses, digital or physical joysticks, and other representations. They may give instructions to the drone to fly to a certain location in the warehouse, such as using a map of the warehouse and/or by altering its roll/pitch/yaw/throttle, take off, land, fly to another item in the list of items stored in the data storage system, hover, scan an item, otherwise collect data about an item, a shelf, or the warehouse, update a 3D map, collect and/or transport an item as payload, or other such instructions.

In some embodiments, the commands can be provided by the user in real time on a command by command basis to control the drone. In some embodiments, one or more sequences of commands can be entered by the user in real time to cause the drone to subsequently execute a sequence of discrete actions for performing a task or mission. In some embodiments, one or more sequences of commands can be entered by the user prior to drone take-off for providing an automated flight plan and/or mission profile for the drone. It will be apparent in view of this disclosure that any command, commands, command sequences, automated flight plans, or automated mission profiles can be configured for using a single drone to complete a task or mission or for using multiple drones to complete a task or mission. For example, in some embodiments, a plurality of drones can be assigned to work in concert to perform a comprehensive warehouse inventory, wherein each drone can inventory a single shelf, rack, etc. before returning to a base station to recharge.

In some embodiments, the drone 100 may be constructed having a frame/body, a single or plurality of rotors/propellers, and one or more landing structures/gears. The frame/body may provide support for the rotors/propellers which may be fixedly attached to and positioned above the frame/body. However, other positions for the rotors/propellers in relation to the frame/body are possible. In addition, in one non-limiting example, the drone 100 may be configured to have a plurality of rotors/propellers equaling four rotors. However, other numbers of rotors/propellers are possible, such as one, two, six, eight or any other suitable number of rotors/propellers. Additionally, one or more landing structures/gears may be attached to the frame/body and the one or more landing structures may be arranged to position the drone 100 in an upright position when the drone 100 is in an inactive, idle, or rest position.

In some embodiments the drone 100 may be directed to land or otherwise come to rest at a designated home position when the drone 100 is not being used. The designated home position can be any location given by a user of the drone 100 to serve as the designated home position. Alternatively or additionally, the designated home position may be a structure such as a platform, a box or other known structure.

During operation the plurality of rotors/propellers may be configured to allow the drone 100 to fly, hover in a fixed location, or otherwise move around an area. Moreover, the drone 100 may require a certain amount of power to operate the plurality of rotors/propellers and other components of the drone 100. In some embodiments, the drone 100 may receive power from a battery pack or other such power storage device. The battery pack may be integrated into and/or mounted onto the frame/body of the drone 100. However, other locations for the battery pack are possible. During periods of rest or inactivity the battery pack may need to be recharged to ensure an adequate supply of power for drone operation. In one non-limiting example, a battery charger may be incorporated within the designated home position. For example, the battery charger may be configured as an inductive charger which sends electromagnetic energy through inductive coupling with an electronic device and the energy may be stored in the battery pack for later use. While the battery charger described here is an inductive charger, any other known types of battery chargers may be used. Moreover, the designated home position may have a wall plug that plugs into a standard wall electrical socket to provide and electricity source for designated home position and the battery charger.

In addition to the battery pack, the drone 100 may carry other parts, such as sensor units, which may include camera, stereo camera, laser depth sensor, LIDAR, and/or other sensors. In one non-limiting example, the sensor unit may be configured to have sensors facing the front, back, left, and right of the drone 100. However, other configurations of sensor units are possible, such as facing front only, facing the four directions plus downward-facing, facing the four directions plus downward and upward-facing, facing four diagonal corners, and other suitable configurations. The drone 100 may also carry an on-board processor unit, which may include CPUs, GPUs, flight controllers, and other processors and microprocessors. This processor unit may contain other electronics, such as IMUS, Wi-Fi devices, other wireless protocol devices, GPS, altimeters, ultrasonic sensors, data storage devices, and/or other electronics.

The user control interface system may run on a device such as a smartphone, a personal computer or laptop, a tablet computer, or any other such device that is capable of connecting to the wireless connection. In some embodiments, the wireless connection may be or include an internet connection. The operator may view the data from the user control interface system on the device, or to a difference device connected to the first device, and may use the user control interface system to send commands through the wireless connection to be executed by the drone 100.

In some implementations, a drone 100 may capture data with its on-board sensors. This data may be processed on-board the drone 100 itself. The processed data may then be sent via a wireless connection such as the internet to one or multiple end devices, to cloud processors, and/or be used by the drone 100 itself for purposes including but not limited to localization, stabilization, and mapping.

The end device may comprise a laptop or desktop computer, smartphone, tablet device, drone base station, drone controller, smartwatch, wall-mounted computing device, or any other such suitable end device. With the received data, the end device may update the information running on its software, such as a GUI. This information may include pictures, videos, barcode scans, parsed text, timestamps, location data, and/or other suitable information.

External processors such as cloud processors may receive unprocessed data directly sent from the drone 100 and/or processed data. In some embodiments, a user control interface system runs on one cloud processor, and processes the processed and/or unprocessed data sent via the drone 100. In one non-limiting configuration, the output of the processing by the user control interface system may be sent to an inventory management system, which may run on another cloud processor. In other configurations, the user control interface system and inventory management system running on one cloud processor together, the systems running on a local non-cloud processor, the systems being bundled together as one software package, or other suitable configurations. The inventory management system may use the data output from the user control interface system to take actions to update and reconcile entries, actions that may include updating item location data, removing duplicate data, adding a timestamp, updating a status of an item, and/or other suitable actions. The inventory management system may send data to the user control interface system, which may take actions to update and reconcile its data. The user control interface system may send data to one or more end devices. This may prompt an end device to update the information running on its software, such as the GUI. This information may include pictures, videos, barcode scans, parsed text, timestamps, location data, status of order, status of item, quantity of item, the need to re-order, and/or other suitable information.

An operator may input commands to an end device. These commands may be input through voice command, physical keyboard, digital keyboard, mouse, touchscreen, joystick, buttons, and/or any other suitable input methods. In one non-limiting configuration, commands may be transmitted through a wireless connection from the end device to cloud processors, such as the processor running a user control interface system. The user control interface system may process the commands, then relay the commands through wireless connection to the drone 100.

Although specific examples of the configurations of devices, data processing, data transmission, and software location are included herein, any of the data processing operations may be performed on any of: a drone 100, multiple drones 100, a base station, an inventory management system (e.g., WMS 2900), a local or cloud-based processor, and/or devices (e.g., user device 2000, device 2700, and/or device 2800) connected to any one or more of the items in this list, or any combination of the foregoing devices. In one non-limiting example, instead of being located on processors on the cloud, a user control interface system and/or an inventory management system may exist on one or more local non-cloud processors. In another non-limiting example, all sensor data processing could be done entirely on the drone 100. Another non-limiting configuration is that when operators input command data to an end device, the end device transmits the commands directly to the drone 100 or the inventory management system, which then may or may not transmit data to the user control interface system.

Generally, any of the functions described herein can be implemented using hardware (e.g., fixed logic circuitry such as integrated circuits), software, firmware, manual processing, or a combination thereof. Thus, the blocks discussed in the above disclosure generally represent hardware (e.g., fixed logic circuitry such as integrated circuits), software, firmware, or a combination thereof. In the instance of a hardware configuration, the various blocks discussed in the above disclosure may be implemented as integrated circuits along with other functionality. Such integrated circuits may include all of the functions of a given block, system, or circuit, or a portion of the functions of the block, system, or circuit. Further, elements of the blocks, systems, or circuits may be implemented across multiple integrated circuits.

Such integrated circuits may comprise various integrated circuits, including, but not necessarily limited to: a monolithic integrated circuit, a flip chip integrated circuit, a multichip module integrated circuit, and/or a mixed signal integrated circuit. In the instance of a software implementation, the various blocks discussed in the above disclosure represent executable instructions (e.g., software modules) that perform specified tasks when executed on a processor (e.g., processor 104). These executable instructions can be stored in one or more tangible computer readable media. In some such instances, the entire system, block, or circuit may be implemented using its software or firmware equivalent. In other instances, one part of a given system, block, or circuit may be implemented in software or firmware, while other parts are implemented in hardware.

It is to be understood that the present application is defined by the appended claims. Although embodiments of the present application have been illustrated and described herein, it is apparent that various modifications may be made by those skilled in the art without departing from the scope and spirit of this disclosure.

What is claimed is:

1. A system for inventory management, comprising:
    an aerial drone;
    one or more optical sensors on the aerial drone;
    an indoor positioning system on the aerial drone; and
    a controller on the aerial drone, the controller communicatively coupled to the one or more optical sensors and the indoor positioning system, the controller configured to:
        while the aerial drone is flying according to an initial flight path, capture, via the one or more optical sensors, image data that comprises a plurality of identifiable elements on inventory items located at opposing sides of an aisle;
        determine respective positions of the identifiable elements based on the captured image data;
        dynamically generate an updated flight path for the aerial drone based on:
            the respective positions of the identifiable elements, and
            a detected position of the aerial drone at which the image data are captured;
        navigate the aerial drone within the aisle based on one or more signals from the indoor positioning system and the dynamically generated updated flight path such that the aerial drone is aligned with, immediately after one another, a first one of the identifiable elements on a first inventory item located at a first side of the aisle and a second one of the identifiable elements on a second inventory item located at a second side of the aisle opposing the first side; and
        while navigating the aerial drone within the aisle based on the dynamically generated updated flight path, sequentially capture, via said one or more optical sensors, information carried by the first and second ones of the identifiable elements; and
        record the captured information.

2. The system of claim 1, wherein the one or more optical sensors comprise at least one of: a camera, a wide-field view camera, a photodetector array, and a laser scanner.

3. The system of claim 1, wherein:
    said dynamically generating the updated flight path for the aerial drone comprises adjusting the initial flight path based on one or more of: an orientation of the particular identifier, a horizontal position of the identifier, and a vertical position of the identifier.

4. The system of claim 1, further comprising a graphics processor that is configured to perform one or more actions for one or more of: the indoor positioning system, the one or more optical sensors, and the controller.

5. The system of claim 1, wherein the one or more optical sensors comprise a first optical sensor and a second optical sensor, the second optical sensor facing an opposite direction relative to the first optical sensor, wherein the first optical sensor and the second optical sensor are configured to respectively align with and detect the first and second ones of the identifiable elements.

6. The system of claim 1, wherein:
    the image data comprises one or more location markers;
    each location marker of the one or more location markers comprises one or more of: a mobile device, a wireless transmitter, a wireless receiver, a pylon, a flag, a colored fiducial marker, a patterned fiducial marker, an indicator light, and other recognizable object.

7. The system of claim 1, wherein the indoor positioning system comprises at least one of:
    a monocular camera,
    a stereoscopic camera,
    a laser depth sensor,
    a LIDAR device,
    a laser rangefinder,
    an ultrasonic rangefinder,
    an RFID detector,
    a WIFI sensor,
    a Bluetooth sensor,
    a distance sensor,
    a laser differential sensor,
    an ultraviolet differential sensor,
    a sonar sensor,
    a radar distance sensor,
    an accelerometer,
    a gyroscope,
    an inertial sensor-based positioning system,
    a triangulation-based indoor positioning system,
    a light detection and ranging-based indoor positioning system,
    a monocular camera-based positioning system,
    a stereoscopic camera-based positioning system, and
    a simultaneous localization and mapping indoor positioning system.

8. The system of claim 1, wherein the controller is further configured to identify the identifiable elements in the image data at least in part by:
    identifying a particular feature of the image data; and
    determining that the particular feature, of the image data, corresponds to a particular element by causing processing, of the image data, based on one or more of: image processing, computer vision, machine learning, Haar Cascade, Neural Network, You Only Look Once, color segmentation, and line segmentation.

9. The system of claim 8, wherein said processing, of the image data, is performed by the controller.

10. The system of claim 8, wherein said causing processing, of the image data, comprises the controller transmitting the image data to a second device, wherein the second device performs said processing of the image data, and wherein the second device transmits results of processing of the image data to the controller.

11. The system of claim 8, wherein the controller is further configured to:
    determine a position of the particular element based on the image data; and wherein said dynamically generating the updated flight path for the aerial drone comprises adjusting the initial flight path based on the determined position of the particular element.

12. The system of claim 11, wherein navigating the aerial drone within the aisle based on the dynamically generated updated flight path causes the aerial drone to align an optical sensor, of the one or more optical sensors, with the particular element.

13. The system of claim 11, wherein navigating the aerial drone within the aisle based on the dynamically generated updated flight path causes the aerial drone to reduce a speed of the aerial drone while in proximity to a detected inventory identifier.

14. The system of claim 1, wherein each of the identifiable elements comprises one of an inventory identifier for an inventory item, an aisle feature, and a location marker.

15. The system of claim 1, wherein the controller is further configured to:
identify a particular element in the image data;
wherein said dynamically generating the updated flight path is based on said identifying the particular element in the image data;
wherein navigating the aerial drone within the aisle facility based on the dynamically generated updated flight path causes the aerial drone to perform at least one of:
stopping;
changing direction;
following a pattern of the initial flight path in an opposite direction from the initial flight path;
aligning an optical sensor of the one or more optical sensors with the particular element, wherein the particular element is an inventory identifier; and
implementing a second pre-determined flight path that is different from the initial flight path.

16. The system of claim 1,
wherein the information carried by the first and second ones of the identifiable elements includes one or more of:
text data,
second image data,
barcode data,
expiration information,
production date information,
environmental tolerances information,
quantity information,
size/volume information,
product weight information,
a SKU number,
a serial number,
shipping information, and
packaging information.

17. A method for inventory management, the method comprising:
while an aerial drone is flying according to an initial flight path, a controller on the aerial drone capturing, via one or more optical sensors on the aerial drone, image data that comprises a plurality of identifiable elements on inventory items located at opposing sides of an aisle;
the controller on the aerial drone determining respective positions of the identifiable elements based on the captured image data;
the controller on the aerial drone dynamically generating an updated flight path for the aerial drone based on:
the respective positions of the identifiable elements, and
a detected position of the aerial drone at which the image data are captured;
the controller on the aerial drone navigating the aerial drone within the aisle based on one or more signals from an indoor positioning system on the aerial drone and the dynamically generated updated flight path such that the aerial drone is aligned with, immediately after one another, a first one of the identifiable elements on a first inventory item located at a first side of the aisle and a second one of the identifiable elements on a second inventory item located at a second side of the aisle opposing the first side; and
while navigating the aerial drone within the aisle based on the dynamically generated updated flight path, the controller on the aerial drone sequentially capturing, via said one or more optical sensors, information carried by the first and second ones of the identifiable elements; and
recording the captured information.

18. The method of claim 17, wherein each of the identifiable elements comprises one of an inventory identifier for an inventory item, an aisle feature, and a location marker.

19. The method of claim 17, wherein navigating the aerial drone within the aisle based on the dynamically generated updated flight path comprises reducing a speed of the aerial drone while in proximity to one of the identifiable elements prior to capturing information carried by the one of the identifiable elements.

20. One or more computer-readable media storing one or more sequences of instructions that, when executed by one or more processors, cause:
while an aerial drone is flying according to an initial flight path, a controller on the aerial drone capturing, via one or more optical sensors on the aerial drone, image data that comprises a plurality of identifiable elements on inventory items located at opposing sides of an aisle;
the controller on the aerial drone determining respective positions of the identifiable elements based on the captured image data;
the controller on the aerial drone dynamically generating an updated flight path for the aerial drone based on:
the respective positions of the identifiable elements, and
a detected position of the aerial drone at which the image data was captured;
the controller on the aerial drone navigating the aerial drone within the aisle based on one or more signals from an indoor positioning system on the aerial drone and the dynamically generated updated flight path such that the aerial drone is aligned with, immediately after one another, a first one of the identifiable elements on a first inventory item located at a first side of the aisle and a second one of the identifiable elements on a second inventory item located at a second side of the aisle opposing the first side; and
while navigating the aerial drone within the aisle based on the dynamically generated updated flight path, the controller on the aerial drone sequentially capturing, via said one or more optical sensors, information carried by the first and second ones of the identifiable elements; and
recording the captured information.

* * * * *